United States Patent
Soldati et al.

(10) Patent No.: US 11,902,846 B2
(45) Date of Patent: Feb. 13, 2024

(54) ENHANCED MOBILITY LOAD BALANCING (MLB) WITH BEAM-SPECIFIC HANDOVER

(71) Applicant: Telefonaktiebolaget LM Ericsson (publ), Stockholm (SE)

(72) Inventors: Pablo Soldati, Solna (SE); Angelo Centonza, Granada (ES); Icaro L. J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 239 days.

(21) Appl. No.: 17/426,165

(22) PCT Filed: Jan. 24, 2020

(86) PCT No.: PCT/SE2020/050056
§ 371 (c)(1),
(2) Date: Jul. 28, 2021

(87) PCT Pub. No.: WO2020/167197
PCT Pub. Date: Aug. 20, 2020

(65) Prior Publication Data
US 2022/0110039 A1    Apr. 7, 2022

Related U.S. Application Data

(60) Provisional application No. 62/803,723, filed on Feb. 11, 2019.

(51) Int. Cl.
*H04W 36/22*    (2009.01)
*H04W 36/00*    (2009.01)
(Continued)

(52) U.S. Cl.
CPC .......... *H04W 36/22* (2013.01); *H04B 7/0695* (2013.01); *H04W 28/082* (2023.05);
(Continued)

(58) Field of Classification Search
CPC ............... H04W 36/22; H04W 28/082; H04W 36/0058; H04W 36/00837; H04W 36/0085; H04W 16/08; H04W 16/28; H04B 7/0695
See application file for complete search history.

(56) References Cited

U.S. PATENT DOCUMENTS

2006/0142021 A1    6/2006  Mueckenheim et al.
2022/0322175 A1*  10/2022  Liu ........................ H04W 36/22

FOREIGN PATENT DOCUMENTS

WO    2018128576 A1    7/2018
WO    WO-2018204863 A1 * 11/2018 ........... H04B 17/309
WO    2020167198 A1    8/2020

OTHER PUBLICATIONS

"Load balancing in NR", 3GPP TsG.RAN WG3 #103, R2-1900663, Athens, Greece, Feb. 25-Mar. 1, 2019, pp. 1-6.
(Continued)

*Primary Examiner* — Ayaz R Sheikh
*Assistant Examiner* — David Zhijun Sun
(74) *Attorney, Agent, or Firm* — Murphy, Bilak & Homiller, PLLC

(57) ABSTRACT

Embodiments include methods for beam-level mobility load balancing, MLB, in a radio access network, RAN. Optionally, such methods include receiving (1810) measurement reports from a plurality of user equipment, each measurement report comprising radio measurements related to a source beam associated with a source node and target beams associated with one or more target nodes. Such methods include exchanging (1820) beam-level load information with the target nodes and, based on the beam-level load information and (optionally) the reports, selecting (1830) one or more target beams, associated with a particular target node, for MLB operations with the source beam. Such methods include transmitting (1840), to the particular target
(Continued)

node, a request including one or more handover offsets to be applied during MLB operations between a group of source beams associated with the source node, including the source beam, and a group of target beams associated with the particular target node, including the selected target beams.

20 Claims, 20 Drawing Sheets

(51) Int. Cl.
    *H04B 7/06*     (2006.01)
    *H04W 28/082*     (2023.01)
(52) U.S. Cl.
    CPC ... *H04W 36/0058* (2018.08); *H04W 36/0085* (2018.08); *H04W 36/00837* (2018.08)

(56) References Cited

OTHER PUBLICATIONS

"Load sharing and load balancing optimization", 3GPP TSG-RAN WG3 #103, R3-190824, Athens, Greece, Feb. 25-Mar. 1, 2019, pp. 1-6.
"3GPP TS 36.423 V15.4.0", 3rd Generation Partnership Project; Technical Specification Group Radio Access Network; Evolved Universal Terrestrial Radio Access Network (E-UTRAN); X2 application protocol (X2AP) (Release 15), Dec. 2018, pp. 1-408.
"3GPP TS 38.300 V15.4.0", 3rd Generation Partnership Project; Technical Specification Group Radio Access Network; NR; NR and NG-RAN Overall Description; Stage 2 (Release 15), Dec. 2018, pp. 1-97.
"(TP for SON BL CR for TS 38.300): MLB", 3GPP TSG-RAN3 Meeting #105bis, R3-195427, Chongqing, China, Oct. 14-18, 2019, pp. 1-5.
"3GPP TS 36.331 V15.10.0", 3rd Generation Partnership Project; Technical Specification Group Radio Access Network; Evolved Universal Terrestrial Radio Access (E-UTRA); Radio Resource Control (RRC); Protocol specification (Release 15), Jul. 2020, pp. 1-965.
"3GPP TS 36.413 V16.1.0", 3rd Generation Partnership Project; Technical Specification Group Radio Access Network; Evolved Universal Terrestrial Radio Access Network (E-UTRAN); S1 Application Protocol (S1AP) (Release 16), Mar. 2020, pp. 1-130.
"3GPP TS 36.423 V15.10.0", 3rd Generation Partnership Project; Technical Specification Group Radio Access Network; Evolved Universal Terrestrial Radio Access Network (E-UTRAN); X2 application protocol (X2AP) (Release 15), Jul. 2020, pp. 1-211.
"3GPP TS 38.413 V15.8.0", 3rd Generation Partnership Project; Technical Specification Group Radio Access Network; NG-RAN; NG Application Protocol (NGAP) (Release 15), Jul. 2020, pp. 1-331.
"3GPP TS 38.423 V15.7.0", 3rd Generation Partnership Project; Technical Specification Group Radio Access Network; NG-RAN; Xn application protocol (XnAP) (Release 15), Mar. 2020, pp. 1-317.
"Discussion for MLB impacts", 3GPP TSG-RAN WG3 #105, R3-194021, Ljubljana, SL, Aug. 26-Aug. 30, 2019, pp. 1-4.
"Load exchange in EN-DC", 3GPP TSG-RAN3 Meeting #104, R3-192967, Reno, Nevada, May 13-17, 2019, pp. 1-3.
"Text proposal for load balancing", 3GPP TSG-RAN WG3 #104, RS-192540, Reno, NV, USA, May 13-17, 2019, pp. 1-2.
"3GPP TS 38.423 V16.2.0", 3rd Generation Partnership Project; Technical Specification Group Radio Access Network; NG-RAN; Xn application protocol (XnAP) (Release 16), Jul. 2020, pp. 1-447.
"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

\* cited by examiner

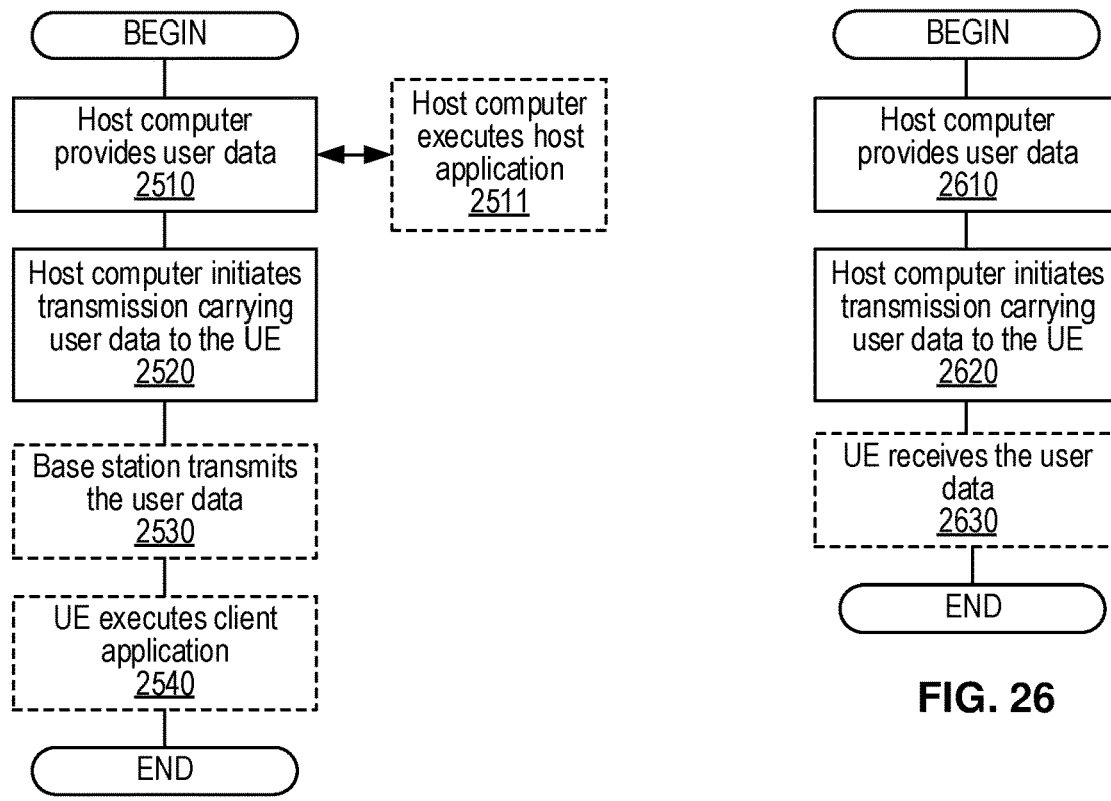
FIG. 25
FIG. 26
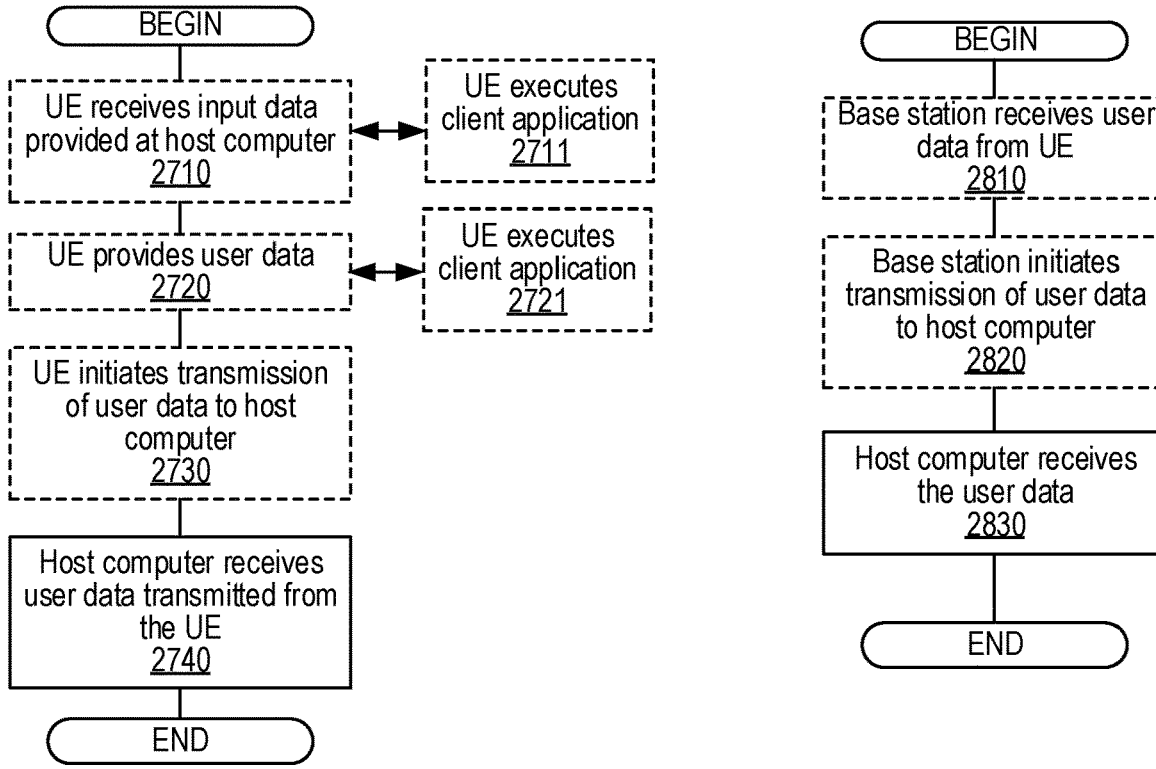
FIG. 27
FIG. 28

ENHANCED MOBILITY LOAD BALANCING (MLB) WITH BEAM-SPECIFIC HANDOVER

TECHNICAL FIELD

The present application relates generally to the field of wireless communications, and more specifically to devices, methods, and computer-readable media that facilitate, enable, and/or improve mobility load balancing (MLB) between beams in a coverage area of a radio access network (RAN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the the vendor of HS S 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The LE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

Furthermore, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz subcarrier bandwidth, a PRB pair comprises 168 REs.

The LTE FDD uplink (UL) radio frame is configured in a similar manner as the exemplary FDD DL radio frame discussed above. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the PHY resources. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for network node DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1,2,3 or 4) is known as the Control Format Indicator (CFI) indicated by the PCFICH transmitted in the first symbol of the control region.

Within the LTE DL, certain REs within each LTE subframe are reserved for the transmission of reference signals, such as DM-RS mentioned above. For example, DM-RS can be carried in OFDM symbols in the sixth, seventh, thirteenth, and fourteenth symbols of the OFDM subframe, with the respective DM-RS REs distributed in the frequency domain within each of the symbols. In addition, the DM-RS REs are divided into two code division multiplexing (CDM) groups referred to as CDM Groups 1 and 2. In LTE systems supporting transmission ranks 1-4, both CDM groups are used in combination with length-2 orthogonal cover codes OCCs. The OCCs are applied to clusters of two adjacent (i.e., in time domain) reference symbols in the same subcarrier in the frequency domain.

To support mobility (e.g., handover or reselection) between cells and/or beams, a UE can perform periodic cell search and measurements of signal power (e.g., reference signal received power, RSRP), signal quality (e.g., reference signal received quality, RSRQ), and/or signal-to-interference-plus-noise ratio (SINR) in both RRC_CONNECTED and RRC_IDLE states. A UE is responsible for detecting new neighbor cells, and for tracking and monitoring already detected cells. An LTE UE can perform such measurements on various downlink reference signals (RS) including, e.g., cell-specific Reference Signal (CRS), MBSFN reference signals, UE-specific DM-RS associated with PDSCH, DM-RS associated with (e/M/N) PDCCH, Positioning Reference Signal (PRS), and CSI Reference Signal (CSI-RS).

Detected cells and measurement values associated with monitored and/or detected cells are reported to the network. Reports to the network can be configured to be periodic or aperiodic based a particular event. Such reports are commonly referred to as mobility measurement reports and contain channel state information (CSI). These reports can be used, e.g., to make decisions on UE mobility (e.g., handover) and/or dynamic activation or deactivation of SCells in a UE's carrier aggregation (CA) configuration.

In general, a radio access node contemplating handover of one or more served UEs to various neighbour (or "target") cells has cell-level load information for the respective neighbour cells. However, a neighbour cell's load distribution in the spatial domain is rarely uniform. This spatial load variation in a cell can create various problems, challenges, difficulties, and/or issues for load balancing in wireless networks, especially for 5G (also referred to as "NR") cellular networks that utilize various beams for coverage.

SUMMARY

Accordingly, exemplary embodiments of the present disclosure address these and other mobility-related issues in wireless communication networks by providing improvements to beam-level mobility operations, such as handovers (including conditional handovers) between one or more beams of a source node and one or more beams of a target node.

Exemplary embodiments of the present disclosure include methods (e.g., procedures) for beam-level mobility load balancing (MLB) in a radio access network (RAN). The exemplary methods can be performed by a source node (e.g., base station, eNB, gNB, etc., or component thereof), in the RAN (e.g., E-UTRAN, NG-RAN), that serves one or more user equipment (e.g., UE, wireless device, MTC device, NB-IoT device, modem, etc. or component thereof) via one or more beams.

In some embodiments, these exemplary methods can include receiving one or more measurement reports from a plurality of UEs. Each measurement report can include radio measurements related to a particular source beam associated with the source node, and a plurality of target beams associated with one or more target nodes in the RAN. These exemplary methods can also include the exchanging of beam-level load information with one or more target nodes in the RAN, e.g., the target nodes associated with the target beams identified in the measurement reports.

In some embodiments, the exchanging operations can include sending a load information request to each of the target nodes. In some embodiments, the load information request to each particular target node can identify one or more target beams for which load information is requested by the source node. The exchanging operations can also include receiving, from each particular target node, target-beam load information for one or more target beams associated with the particular target node (e.g., the target beams identified in the load information request). In this manner, the source node can collect and/or receive beam-level load information from the respective target nodes.

These exemplary methods can also include selecting one or more particular target beams, associated with a particular target node, for MLB operations with the particular source beam. This selection can be based on the the received beam-level load information. In embodiments where the source node receives measurement reports related to a plurality of target beams, the particular target beams can be selected from the plurality of target beams further based on the measurement reports.

These exemplary methods can also include transmitting, to the particular target node, a request including one or more first handover offsets to be applied during MLB operations between: a group of one or more source beams associated with the source node, including the particular source beam; and a group of one or more target beams associated with the particular target node, including the selected target beams. In some embodiments, each beam, of the group of source beams and the group of target beams, can be one of the following: an SS/PBCH block (SSB) beam, a channel state information reference signal (CSI-RS) beam, or a link beam.

In some embodiments, these exemplary methods can also include receiving, from the particular target node, a response including an acknowledgement that the one or more first handover offsets will be applied, or one or more second handover offsets to be applied instead of the one or more first handover offsets.

In some embodiments, the request can be a Handover Request (e.g., a message) for a subset of the first plurality of UEs to the selected target beam, and the response can be a Handover Request Acknowlege message or a Handover Preparation Failure message. In such embodiments, the Handover Request message can also include information identifying one or more of the following:
 the subset of UEs;
 the group of target beams, including the selected target beams;
 expected load to be handed over;
 expected resources or capacity needed to serve UEs being handed over;
 type of traffic being handed over; and
 one or more network slices associated with the subset of the first plurality of UEs and/or the type of traffic being handed over.

In some embodiments, the Handover Request Acknowledge message can include measurement configuration information, for the subset of the first plurality of UEs, with respect to one or more beams of the particular target node.

In other embodiments, the request can be a Mobility Setting Change Request message and the response can be a Mobility Setting Change Response message. In these embodiments, these exemplary methods can also include performing a handover procedure for the subset of the first plurality of UEs to the selected target beam based on the one or more first handover offsets (e.g., based on the received response including an acknowledgement) or the one or more second handover offsets (e.g., based on received response including the second handover offsets).

In some embodiments, the one or more first handover offsets can include one or more of the following:
 a handover offset specific to a first beam of the group of target beams (e.g., without being specific to any source beam);
 a handover offset specific to the group of target beams (e.g., without being specific to any source beam);
 a handover offset specific to the group of target beams and to a second beam of the group of source beams;
 a handover offset specific to a first beam from the group of target beams and to a second beam of the group of source beams; and
 a handover offset specific to the subset of UEs.

Other exemplary embodiments include additional methods (e.g., procedures) for beam-level mobility load balancing (MLB) in a radio access network (RAN). These exemplary methods can be performed by a target node (e.g., base station, eNB, gNB, etc., or component thereof) in the RAN (e.g., E-UTRAN, NG-RAN) that utilizes beams to communicate with one or more user equipment (e.g., UE, wireless device, MTC device, NB-IoT device, modem, etc. or component thereof).

These exemplary methods can include exchanging beam-level load information with a source node. In some embodiments, the exchanging operations can include receiving a load information request from the source node. In some embodiments, the load information request from the source node can identify one or more target beams for which load information is requested by the source node. The exchanging operations can also include sending, to the target node, target-beam load information for one or more target beams associated with the target node (e.g., the target beams identified in the load information request). In this manner, the source node can collect and/or receive beam-level load information from the target node.

The exemplary method can also include receiving, from the source node, a request including one or more first handover offsets to be applied during MLB operations between a group of one or more source beams associated with the source node, including particular source beam serving a first plurality of UEs; and a group of one or more target beams associated with the target node.

In some embodiments, the exemplary method can also include receiving one or more measurement reports from a second plurality of UEs (e.g., UEs served by the target node), each measurement report including radio measurements related to one or more target beams associated with the target node. In such embodiments, the exemplary method can also include determining, based on the measurement reports and the beam-level load information, one or more second handover offsets to be applied instead of the one or more first handover offsets.

In some embodiments, the exemplary method can also include transmitting, to the source node, a response including an acknowledgement that the one or more first handover offsets will be applied, or one or more second (e.g., determined) handover offsets to be applied instead of the one or more first (e.g., received) handover offsets.

In some embodiments, the request can be a Handover Request (e.g., a message) for a subset of the first plurality of UEs to the selected target beam, and the response can be a Handover Request Acknowlege message or a Handover Preparation Failure message. In such embodiments, the Handover Request message can also include information identifying one or more of the following:
 the subset of UEs;
 the group of target beams, including the selected target beams;
 expected load to be handed over;
 expected resources or capacity needed to serve UEs being handed over;
 type of traffic being handed over; and
 one or more network slices associated with the subset of the first plurality of UEs and/or the type of traffic being handed over.

In some embodiments, the Handover Request Acknowledge message can include measurement configuration information, for the subset of the first plurality of UEs, with respect to one or more beams of the target node.

In other embodiments, the received request can be a Mobility Setting Change Request message and the transmitted response can be a Mobility Setting Change Response message. In these embodiments, the exemplary method can also include performing a handover procedure for the subset of the first plurality of UEs to the particular target beam based on the one or more first handover offsets (e.g., based on the transmitted response including an acknowledgement) or the one or more second handover offsets (e.g., based on the transmitted response including the second handover offsets).

In some embodiments, the first handover offsets can include one or more of the following:
a handover offset specific to a first beam of the group of target beams (e.g., without being specific to any source beam);
a handover offset specific to the group of target beams (e.g., without being specific to any source beam);
a handover offset specific to the group of target beams and to a second beam of the group of source beams;
a handover offset specific to a first beam from the group of target beams and to a second beam of the group of source beams; and
a handover offset specific to the subset of UEs.

In some embodiments, each beam, of the particular source beam and the plurality of target beams, can be one of the following: an SS/PBCH block (SSB) beam, a channel state information reference signal (CSI-RS) beam, or a link beam.

Other exemplary embodiments include network nodes (e.g., gNBs, eNBs, base stations, etc. or components thereof) configured to perform operations corresponding to any of the exemplary methods described herein. Other exemplary embodiments include non-transitory, computer-readable media storing computer-executable instructions that, when executed by processing circuitry of a network node, configure the network node to perform operations corresponding to any of the methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIGS. 25-28 are flow diagrams of exemplary methods (e.g., procedures) for transmission and/or reception of user data, according to various exemplary embodiments of the present disclosure.

DETAILED DESCRIPTION

Figure 1:
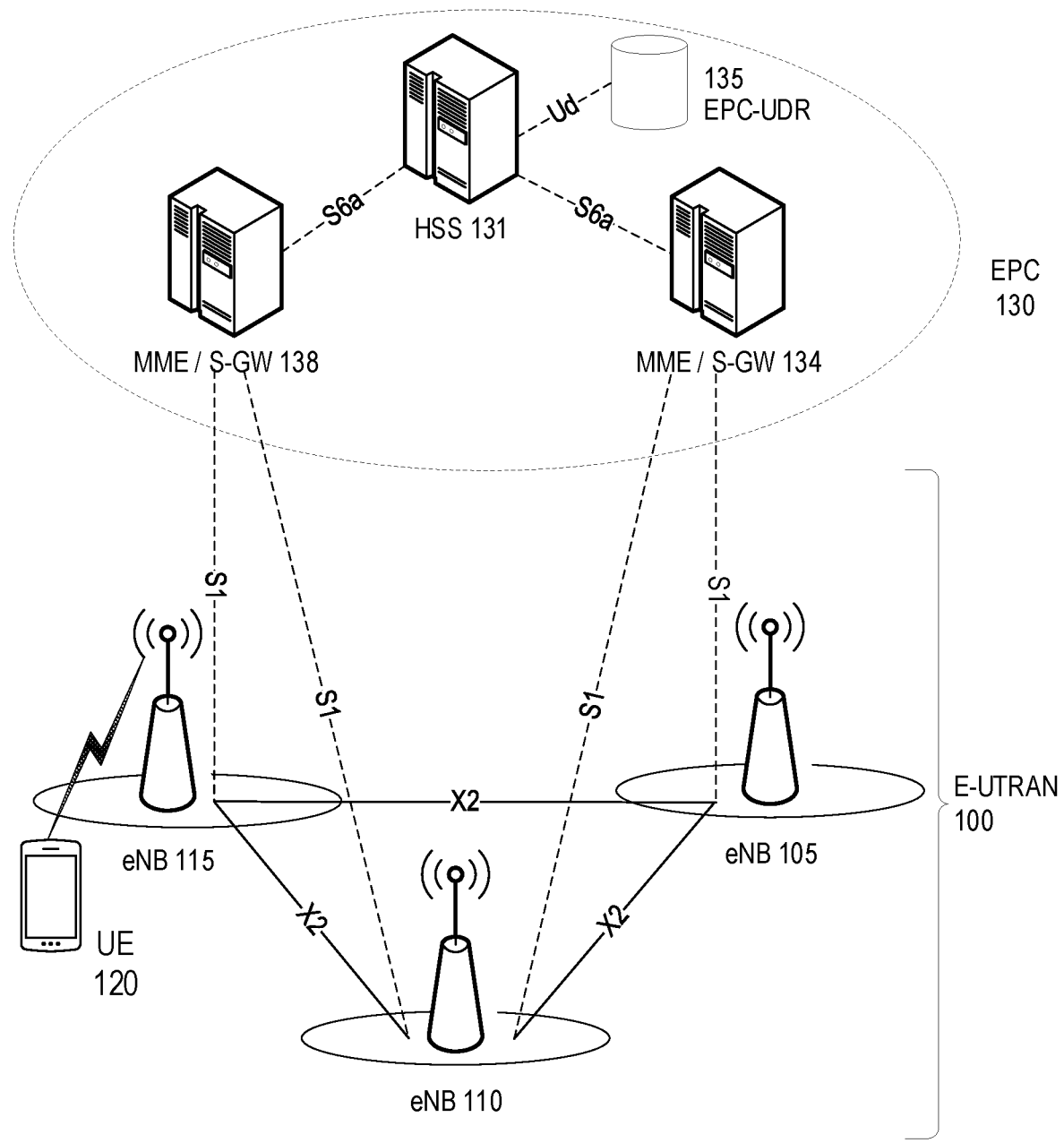
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
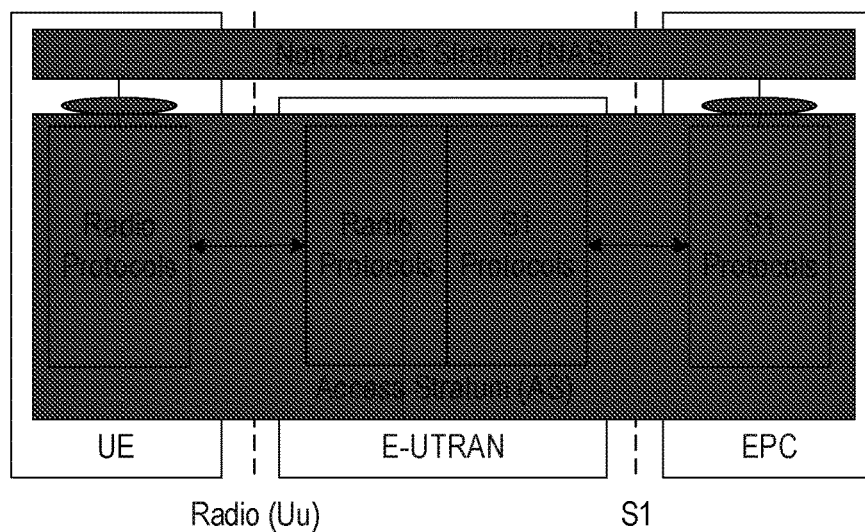
FIG. 2A is a high-level block diagram of an exemplary E-UTRAN architecture in terms of its constituent components, protocols, and interfaces.
Figure 2B:
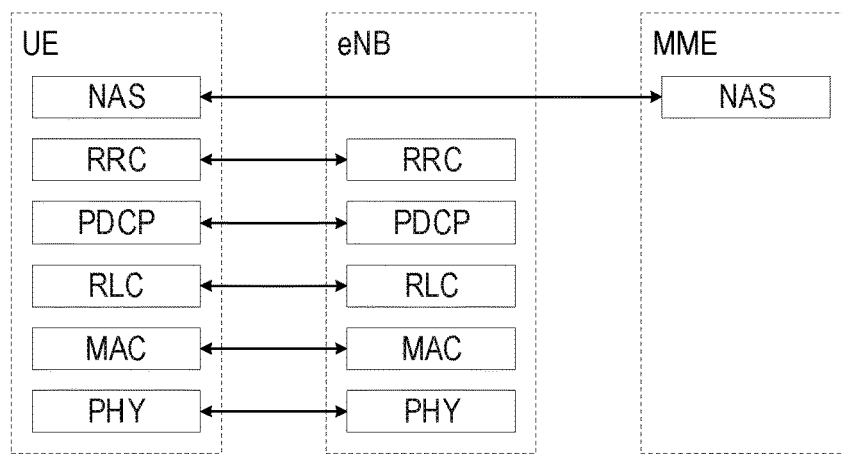
FIG. 2B is a block diagram of exemplary protocol layers of the control-plane portion of the radio (Uu) interface between a user equipment (UE) and the E-UTRAN.
Figure 2C:
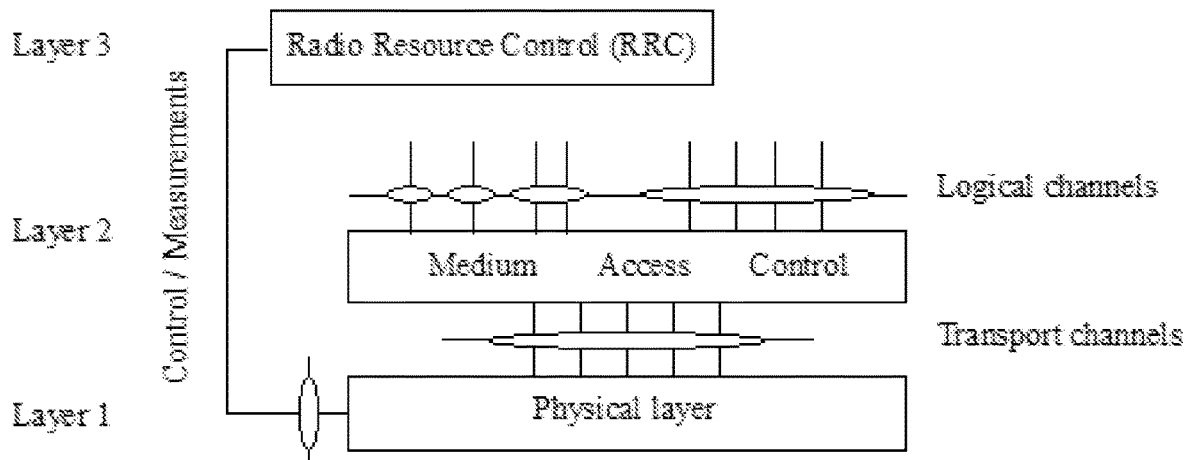
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (network node) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As discussed above, a radio access node contemplating handover of one or more served UEs to various neighbour (or "target") cells has cell-level load information for the respective neighbour cells. However, a neighbour cell's load distribution in the spatial domain is rarely uniform. This spatial load variation in a cell can create various problems, challenges, difficulties, and/or issues for load balancing in wireless networks. These aspects are discussed in more detail below, along with exemplary solutions provided by embodiments of the present disclosure.

While LTE was primarily designed for user-to-user communications, 5G (also referred to as "NR") cellular networks are envisioned to support both high single-user data rates (e.g., 1 Gb/s) and large-scale, machine-to-machine (M2M) communication involving short, bursty transmissions from many different devices that share the frequency bandwidth. The 5G radio interface (also referred to as "New Radio" or "NR") targets a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized, 1-ms subframes. Each subframe includes one or more slots, and each slot includes 14 (for normal cyclic prefix) or 12 (for extended cyclic prefix) time-domain symbols. Similar to LTE, NR data scheduling is done on a per-slot basis.

In addition, NR includes a Type-B scheduling, also known as "mini-slots." These are shorter than slots, typically ranging from one symbol up to one less than the number of symbols in a slot, and can start at any symbol of a slot. Mini-slots can be used if the transmission duration of a slot is too long and/or the occurrence of the next slot start (slot alignment) is too late.

Figure 3:
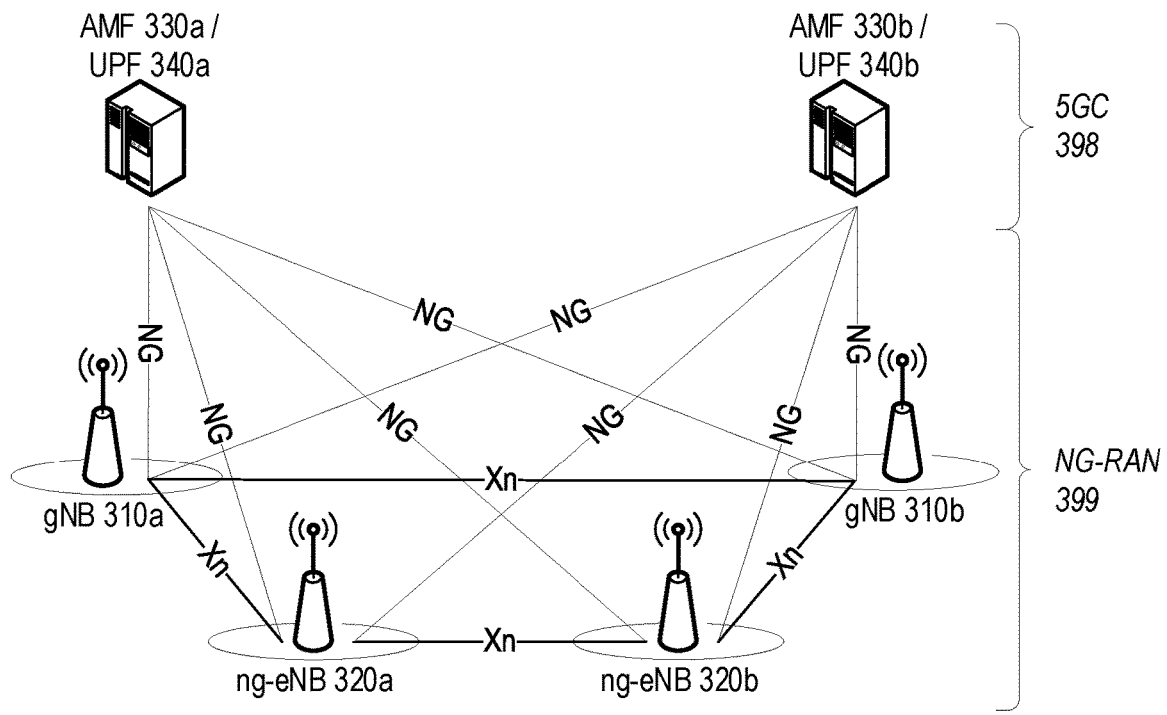
FIGS. 3-4 show two high-level views of an exemplary 5G network architecture.

FIG. 3 shows a high-level view of an exemplary 5G network architecture, including a Next Generation Radio Access Network (NG-RAN) 399 and a 5G Core (5GC) 398. As shown in the figure, NG-RAN 399 can include gNBs 310 (e.g., 310*a,b*) and ng-eNBs 320 (e.g., 320*a,b*) that are interconnected with each other via respective Xn interfaces. The gNBs and ng-eNBs are also connected via the NG interfaces to 5GC 398, more specifically to the AMF (Access and Mobility Management Function) 230 (e.g., AMFs 230*a, b*) via respective NG-C interfaces and to the UPF (User Plane Function) 240 (e.g., UPFs 240*a,b*) via respective NG-U interfaces.

Each of the gNBs 310 can support the NR radio interface, including frequency division duplexing (FDD), time division duplexing (TDD), or a combination thereof. In contrast, each of ng-eNBs 320 supports the LTE radio interface but, unlike conventional LTE eNBs (such as shown in FIG. 1), connect to the 5GC via the NG interface.

Figure 4:
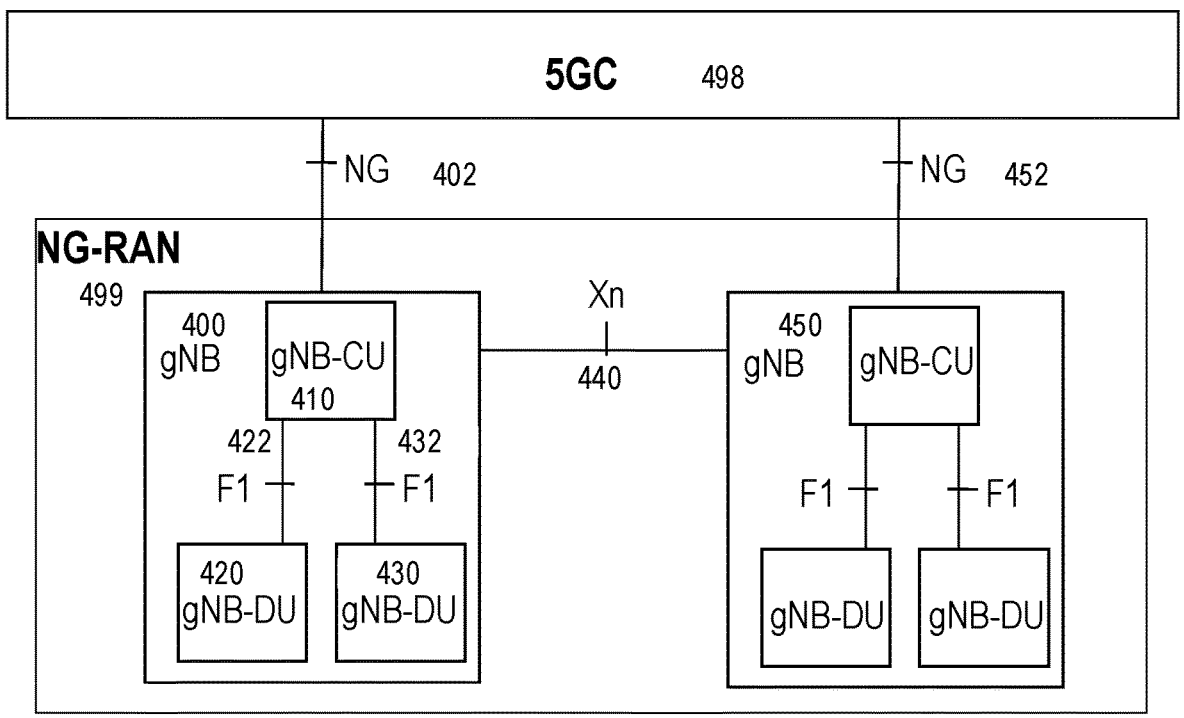

FIG. 4 illustrates another high-level view of an exemplary 5G network architecture. The network shown in FIG. 4 includes NG-RAN 499 and 5GC 498, which can be similar to NG-RAN 399 and 5GC 398 illustrated in FIG. 3. More specifically, NG-RAN 499 can include gNBs connected to the 5GC via one or more NG interfaces, such as gNBs 400, 450 connected via interfaces 402, 452, respectively. In addition, the gNBs can be connected to each other via one or more Xn interfaces, such as Xn interface 440 between gNBs 400 and 450.

In the split-RAN architecture shown in FIG. 4, NG-RAN nodes include a central unit (CU or gNB-CU) and one or more distributed units (DUs or gNB-DUs). For example, gNB 400 in FIG. 4 includes gNB-CU 410 and gNB-DUs 420 and 430. CUs (e.g., gNB-CU 410) are logical nodes that host higher-layer protocols and perform various gNB functions such controlling the operation of DUs. Likewise, DUs are logical nodes that host lower-layer protocols and can include, depending on the functional split, various subsets of the gNB functions. As such, each of the CUs and DUs can include various circuitry needed to perform their respective functions, including processing circuitry, interface and/or transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 422 and 432 shown in FIG. 4. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

As mentioned above, a UE in RRC_CONNECTED mode can be configured by the network to perform measurements and send measurement reports to the network node hosting its current serving cell. For example, the network can configure a UE to perform measurements on various carrier frequencies and various radio access technologies (RATs) corresponding to neighbor cells, as well as for various purposes including, e.g., mobility and positioning. The configuration for each of these measurements is referred to as a "measurement object." Furthermore, the UE can be configured to perform the measurements according to a "measurement gap pattern" (or "gap pattern" for short), which can comprise a measurement gap repetition period (MGRP) (i.e., how often a regular gap available for measurements occurs) and a measurement gap length (MGL) (i.e., the length of each gap).

Upon receiving measurement reports that meet predetermined triggering criteria, the network may send a handover command to the UE. In LTE, this command is an RRConnectionReconfiguration message with a mobilityControlInfo field. In NR, this command is an RRCReconfiguration message with a reconfigurationWithSync field.

The basic mobility solution in NR shares some similarities to LTE. The UE may be configured by the network to perform cell measurements and report them, to assist the network to take mobility decisions. However, an NR UE may be configured to perform L3 beam measurements based on different reference signals and report them for each cell (serving and non-serving/candidate (e.g.) fulfilling triggering conditions for measurement report (e.g., an "A3 event"). In particular, NR UEs can be configured to perform/report measurements on SS/PBCH blocks (SSBs) in addition to the reference signals measured/reported by LTE UEs (e.g., CSI-RS). Each SSB is carried in four (4) adjacent OFDM symbols, and comprises a combination of primary synchronization signal (PSS), secondary synchronization signal (SSS), DM-RS, and physical broadcast channel (PBCH).

As described in 3GPP TS 38.300 (v15.4.0), an NR UE in RRC_CONNECTED mode measures one or more detected beams of a cell and then averages the measurements results (e.g., power values) to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving/candidate cell(s). Measurement reports may contain the measurement results of the X best beams if the UE is configured to do so by the gNB.

In the present disclosure, the term "beam" is used to refer to the coverage area of a reference signal that may be measured by a UE. In NR, for example, such reference signals can include any of the following, alone or in combination: SSB; CSI-RS; tertiary reference signal (or any other sync signal); PRS; DM-RS; and any other reference signal that may be beamformed for transmission. Such beams can be correlated and/or coextensive with other beams used by eNBs or gNBS to transmit and/or receive physical data channels (e.g., PDSCH, PUSCH) and/or physical control channels (e.g., PDCCH, PUCCH).

In making handover (and, more generally, mobility) decisions for individual UEs, the network takes into account not only the UE-reported measurements but also the load of the respective cells in the network. In the present disclosure, the term "load" (or equivalently "load information" or "load-related information") can refer to a measure of resources being consumed (e.g., by the respective cells) or a measure of an available capacity (e.g., remaining in the respective cells). The loads of cells served by a radio access node are typically measured frequently. When the load of a cell exceeds a pre-configured threshold, procedures can be triggered to transfer some UE traffic from the overloaded cell to either a neighbor cell of the same radio access technology (RAT), a different RAT, a different frequency, etc.

Put differently, a mobility load balancing (MLB) algorithm running at a radio access node (e.g., eNB or gNB) has to decide which UEs will be handed over ("UE selection") and to which neighbor cells ("cell selection"). These decisions are typically made based on the load reports and any available radio measurements of source cell and neighbor cells, such as measurements reported by UEs operating in RRC_CONNECTED and RRC_IDLE states.

In general, a radio access node contemplating handover of one or more served UEs to various neighbour (or "target") cells has cell-level load information for the respective neighbour cells. However, a neighbour cell's load distribution in the spatial domain is rarely uniform. For example, when a network node uses beamforming, the coverage of a cell may be further divided into the coverage of different beams. In such case, the load distribution among the beams of a cell will typically be non-uniform and, in some cases, can vary significantly from beam to beam. This beam-level variation in a cell can create various problems, challenges, difficulties, and/or issues for MLB in wireless networks.

Figure 5:
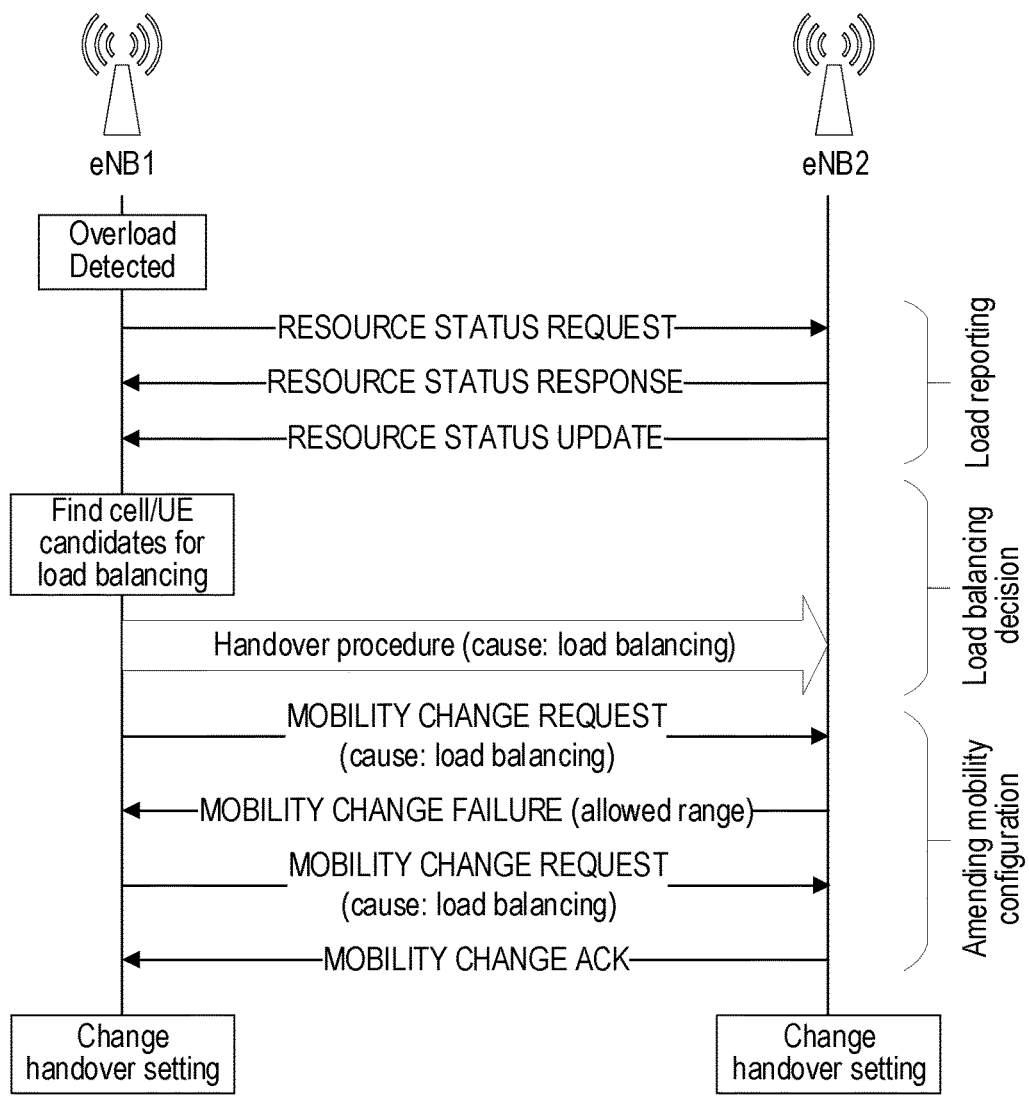
FIG. 5 shows an exemplary Mobility Setting Change procedure.

FIG. 5 shows an exemplary Mobility Setting Change procedure for LTE networks (e.g., as specified by 3GPP TS 36.423 (v15.4.0)), which can be run before or after a MLB handover is performed. This procedure is aimed at negotiating, between a source cell and potential target cell, a change on the *Handover Trigger event, which is used to trigger the UE mobility from one cell to another. As an example, consider the case where the Mobility Setting Change is performed after the HO. Once the source eNB has selected the target eNB and which UE's will be offloaded, it performs a Mobility Setting Change. During this procedure, new mobility settings are negotiated between the source and target eNBs so that the UE's handed over due to MLB will not be immediately handed over back to the source cell. The procedure can either be followed or preceded by ordinary handovers, depending on the vendor implementation.

Figure 6:
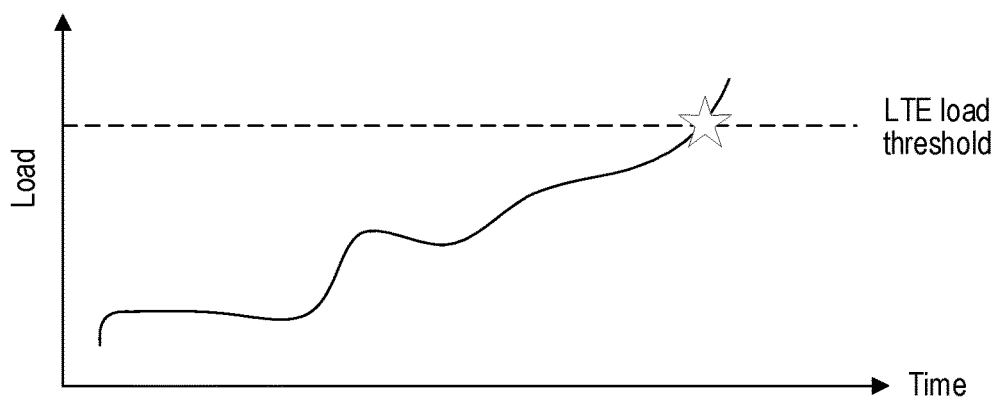
FIG. 6 shows an exemplary variation of cell load vs. time, with an exemplary predefined load threshold.

Currently, 3GPP specifies the following components and/or functions for MLB in LTE networks: 1) load reporting; 2) load balancing action based on handovers; and 3) adapting handover (HO) and/or cell reselection (CR) configuration so that load remains balanced. The load reporting function is executed by exchanging cell specific load information between neighbor enhanced NodeBs (eNBs) over the X2 (intra-LTE scenario) or S1 (inter-RAT scenario) interfaces. In the case of intra-LTE load balance, the source eNB may trigger a RESOURCE STATUS REQUEST message to potential target eNBs at any point in time, for example when the load is above a pre-defined value and/or threshold. FIG. 6 is a graph showing an exemplary variation of cell load vs. time, with an exemplary predefined load threshold (i.e., Lte_load_threshold).

Figure 7:
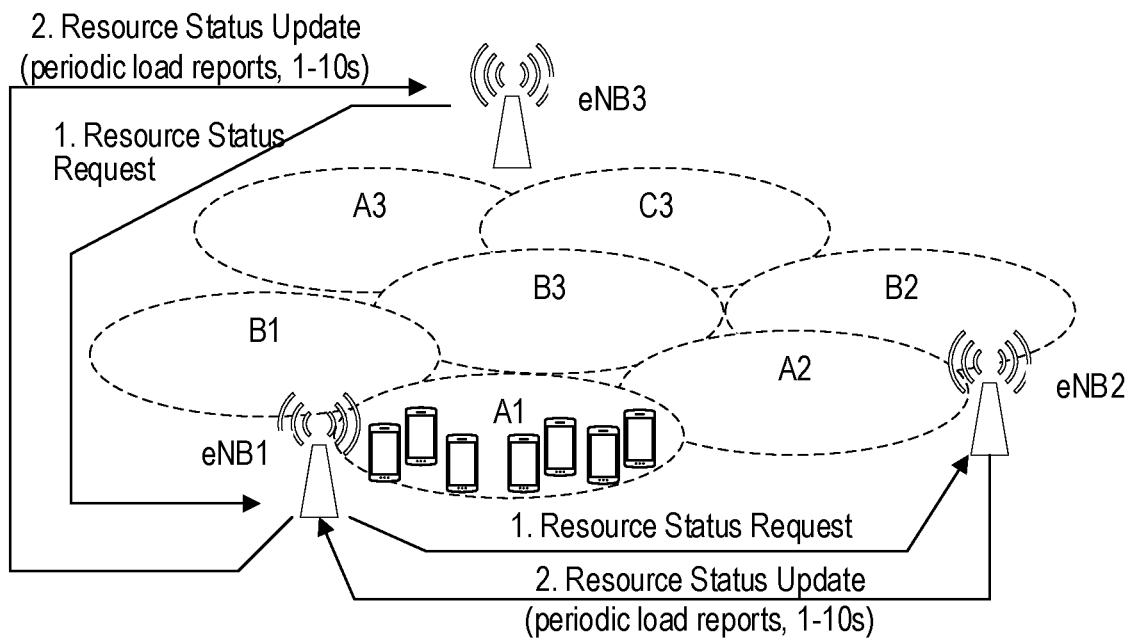
FIG. 7 illustrates an exemplary LTE mobility load balancing (MLB) scenario involving three (3) eNBs.

FIG. 7 illustrates an exemplary LTE MLB scenario involving three (3) eNBs. In this scenario, eNB1 serves cells A1 and B1, eNB2 serves cells A2 and B2, and eNB3 serves cells A3, B3, and C3. Furthermore, eNB2 and eNB3 periodically report load values for their served cells to eNB1. In addition, UEs operating in a cell served by eNB1 (e.g., A1) may send measurement reports (RSRP, RSRQ, SINR, etc.) to eNB1 for one or more neighbour cells (e.g. A2, B3). Based on these reports and the received load information for neighbor cells, eNB1 may decide to handover one or more UE from A1 to a neighbour cell such as B3 or A2. When eNB1 decides to offload a UE (e.g., to A2), it triggers an ordinary handover, including a handover preparation with a selected target node (e.g., eNB2). This can also include a Mobility Setting Change for the offloaded UE, as described above with reference to FIG. 5.

There are two approaches to handover UEs to the target eNBs. First, by applying a HO offset between the cells, the "border" of a congested and/or heavily loaded cell can be effectively "moved" to reduce its coverage area. With this approach, the source eNB negotiates with target eNBs for the HO offset settings to avoid handover bouncing (also referred to as "ping-pong") between source and target cells. The agreed offset will be signalled to the UEs served by the source eNB and no specific set of UEs will be selected in this case.

In a second approach, a source eNB may command HOs to a specific set of UEs towards a selected target eNB (as discussed above. The algorithms for UE/target cell selection are non-standardized (e.g., vendor-proprietary). Besides cell-specific information (e.g., source and target cell load and capacity), these algorithms take into account at least some of the following UE-specific information as input (e.g., depending on availability): radio measurement reports; traffic characteristics (e.g., heavy or light data usage); bearers (e.g., guaranteed bit-rate (GBR) or default); historical and/or current resource utilization; and UE profile (e.g., "gold", "silver", "bronze").

Of these parameters, the UE radio measurement reports are important to select UEs that have acceptable radio quality in the target eNB. On the other hand, it is also possible to command the HO blindly without the report, assuming that coverage is available. Given other inputs, algorithms with different targets may be developed, e.g. to prioritize heavy users, bronze users, default bear users, etc.

Figure 8:
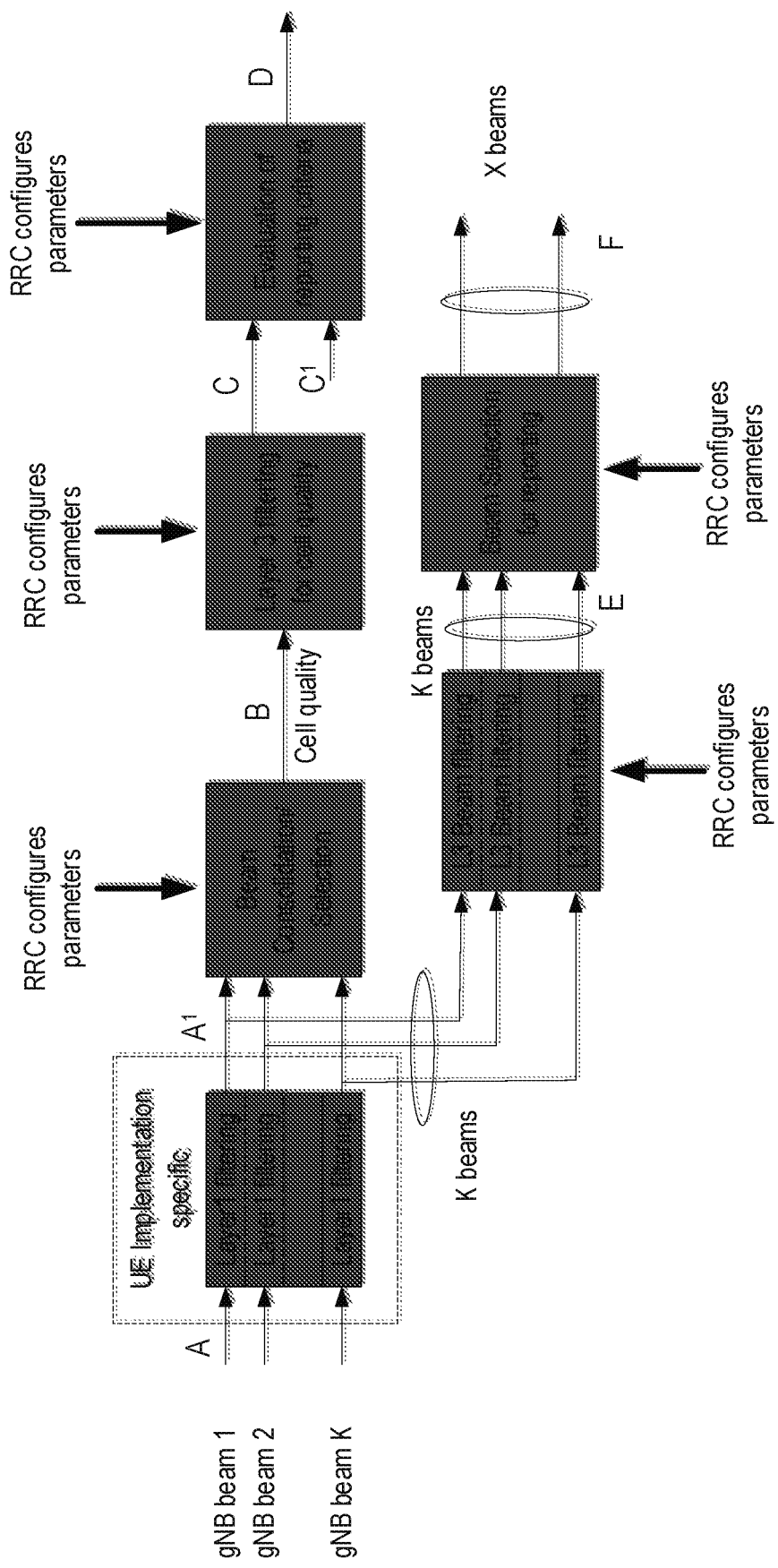
FIG. 8 shows an exemplary configuration of a UE measurement model for NR.

FIG. 8 shows an exemplary configuration of a UE measurement model for NR, which was briefly mentioned above. In this model, the UE measures k beams transmitted by a gNB for a particular cell. These k beams correspond to measurements on SSB or CSI-RS resources configured for L3 mobility by the network (e.g., gNB) and detected by UE at L1. These beam-specific measurements are labelled "A", and are typically internal to the PHY. The UE then filters each of these k measurements over time (referred to as "layer-1 filtering"), resulting in k time-filtered beam measurements labelled "A1". Neither the measurements themselves ("A") nor the layer-1 filtering is standardized, i.e., it is typically implementation-dependent. The "A1" measurements are reported to layer 3 (L3), e.g., the RRC layer.

The UE then consolidates these k beam measurements into a cell quality estimate ("B") based on parameters configured by the network via RRC signalling. The behaviour of the Beam consolidation/selection is standardised. The cell-quality estimate "B" are reported to layer-3 at the same rate as the beam measurements "A1."

The UE further time-filters the cell quality estimate (referred to as "layer 3 filtering") resulting in filtered measurement "C" shown in the figure. The behaviour of these layer-3 filters is standardised and the configuration of the layer-3 filters is provided by RRC signalling. Filtering reporting period at "C" equals one measurement period at "B".

The UE then checks whether actual measurement reporting is necessary at point D. The evaluation can be based on more than one flow of measurements at reference point C, e.g., to compare between different measurements. This is illustrated by inputs C and $C^1$. The UE evaluates the reporting criteria at least every time a new measurement result is reported at point C, $C^1$. The reporting criteria are standardised and the configuration is provided from the network by RRC signalling. The value "D" (which can be based on "C") is reported to the network in an RRC measurement report.

In addition, the time-filtered beam measurements "A1" are further filtered at the RRC layer ("layer 3") based on a network provided configuration, resulting in filtered beam measurements "E". Filtering reporting period at "E" equals one measurement period at "A1". The UE selects X beam measurements from these k filtered beam measurements for beam-quality reporting to the network (labelled "F" in the figure). The behaviour of the beam selection is standardised and the configuration is provided by the network by RRC signalling.

Measurement reports can have various characteristics depending on the particular scenario. Measurement reports typically include the measurement identity of the associated measurement configuration that triggered the reporting. As mentioned above, cell and beam measurement quantities to be included in measurement reports are configured by the network. For example, the network can configure beam measurements as beam identifier only, measurement result and beam identifier, or no beam reporting. Furthermore, the number of non-serving cells to be reported can be limited through configuration by the network. In addition, cells belonging to a blacklist configured by the network are not used in event evaluation and reporting; conversely, when a whitelist is configured by the network, only the cells belonging to the whitelist are used in event evaluation and reporting.

Furthermore, neighbour cell measurements can be intra- or inter-frequency with respect to the serving cell. A measurement is defined as an "SSB based intra-frequency measurement" provided that the centre frequency of the SSB of the serving cell and the centre frequency of the SSB of the neighbour cell are the same, and the subcarrier spacing of the two SSBs is also the same. A measurement is defined as an "SSB based inter-frequency measurement" provided that the centre frequency of the SSB of the serving cell and the centre frequency of the SSB of the neighbour cell are different, or the subcarrier spacing of the two SSBs is different.

Similarly, a measurement is defined as a "CSI-RS based intra-frequency measurement" provided that the bandwidth of the CSI-RS resource on the neighbour cell configured for measurement is within the bandwidth of the CSI-RS resource on the serving cell configured for measurement, and the subcarrier spacing of the two CSI-RS resources is the same. A measurement is defined as a "CSI-RS based inter-frequency measurement" provided that the bandwidth of the CSI-RS resource on the neighbour cell configured for measurement is not within the bandwidth of the CSI-RS resource on the serving cell configured for measurement, or the subcarrier spacing of the two CSI-RS resources is different.

Figure 9:
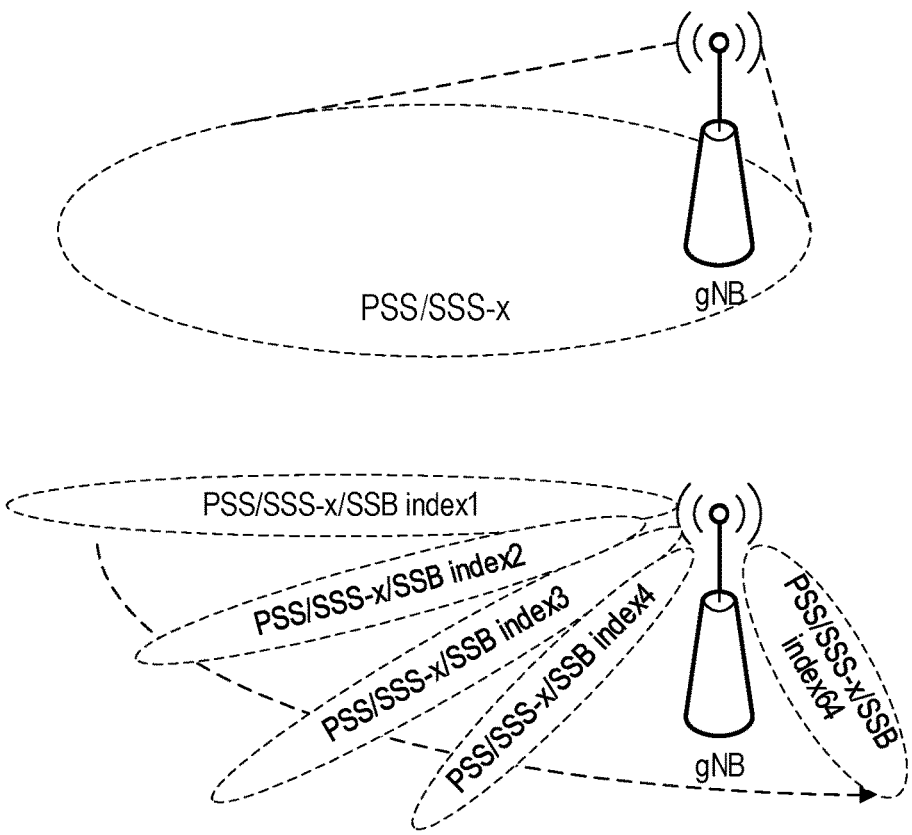
FIG. 9 illustrates an exemplary arrangement where a cell includes 65 different downlink beams associated with SSB indices 0-64 respectively.

In LTE and NR, handovers or PSCell change decisions (e.g., when a UE is operating in any form of dual connectivity, carrier aggregation, etc.) are typically made based on the coverage and quality of a serving cell compared to the quality of a neighbour cell handover candidate. Quality is typically measured in terms of RSRQ or SINR, while coverage is typically measured based on RSRP. In NR, a cell may be comprised by a set of beams where PSS/SSS are transmitted in different downlink beams, each beam associated with a different SSB index. FIG. 9 illustrates an exemplary arrangement where a cell includes 65 different downlink beams associated with SSB indices 0-64 respectively.

Figure 10:
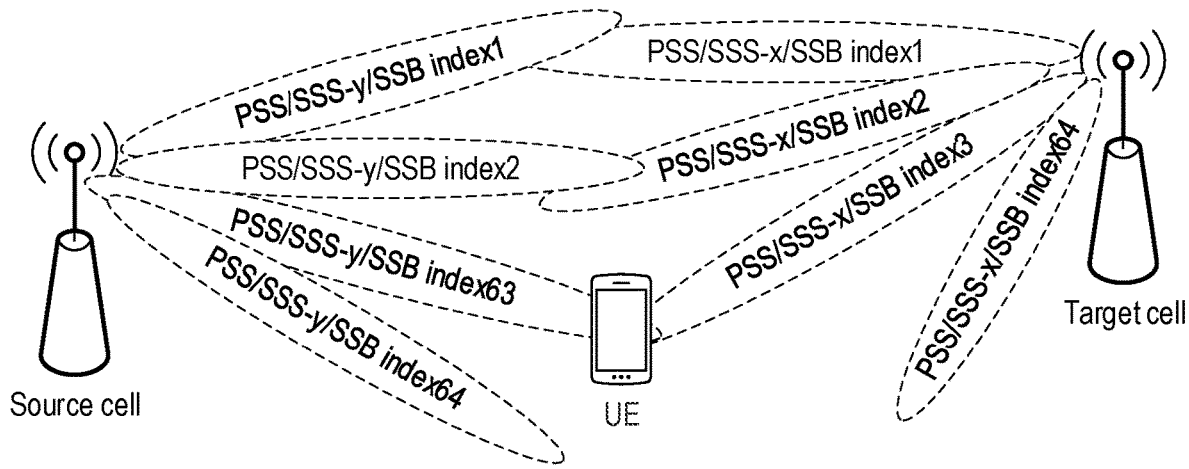
FIG. 10 shows an exemplary handover scenario of a UE from a beam of a source cell to a beam of a target cell.

As discussed above with reference to FIG. 8, beam measurement information (SSB/CSI-RS indexes with or without associated measurements) may be included in measurement reports. One of the purposes of these beam reports is to enable a source node to take educated UE mobility decisions to avoid UE ping-pong between serving cells. For example, if multiple neighbour cells are reported (e.g., based on a mobility event where the trigger condition is that the neighbor cell signal becomes better than the source by a certain offset), and these cells have somewhat similar quality/coverage (e.g. similar RSRP and/or RSRQ), beam-quality reports can be used to decide where to handover the UE. For example, network could prioritize the cells with more beams than another cell. FIG. 10 shows an exemplary scenario of handover of a UE from a beam of a source cell to one beam of a target cell having 65 total downlink beams.

Recently within 3GPP, a new Study on RAN-centric data collection and utilization for LTE and NR has been approved. As part of that study, the following objectives has been listed, where load balancing is mentioned as one of the features to be studied:

1. Study the use cases and benefits of RAN centric Data utilization, e.g., SON features including mobility optimization (cell and beam based), RACH optimization, load sharing/balancing related optimization, coverage and capacity optimisation, Minimization of Drive testing (MDT), URLLC optimisation, LTE-V2X (i.e., PC5 and uu), etc., applicable to different scenarios in NG-RAN, MR-DC connected to 5GC and EPC and LTE and take NR new features, e.g., beam, network slice, BWP, duplication etc. into account [RAN3, RAN2].
2. Identify necessary standard impact on data collection and utilization for the defined use cases and scenarios, including,
   Definition: Identify relevant measurement quantities, events and faults for collection and utilization. On top of existing RRM measurements and LTE L2 measurements, identify metrics to be newly introduced or to be refined, including [RAN2]:
   a. RRM measurement quantities, RLF and access failure information, etc from consenting UEs,
   b. L2 measurement quantities.
   c. L1 measurement quantities (e.g. Timing Advance in RAR)
   d. Sensor data for UE orientation/altitude to log in addition to location (e.g., digital compass, gyroscope, barometer)
   Collection: Study the procedure for configuration and collection of UE measurements, L1/L2 RAN node measurements and signalling procedure for distributed and central analysis. Identify the potential standard impact on related network entities. Additionally for MDT study following solutions [RAN3, RAN2]:
   a. Logged MDT focusing on RRM measurements;
   b. Immediate MDT focusing on RRM measurements;
   Utilization: Study necessary procedures and information exchange required for different use cases, e.g. SON, RRM enhancement, edge computing, radio network information exposure, URLLC and LTE-V2X (i.e., PC5 and uu), etc [RAN3].
3. If necessary, investigate the benefits and feasibility of introducing a logical entity/function for RAN centric data collection and utilization [RAN3].

Figure 11:
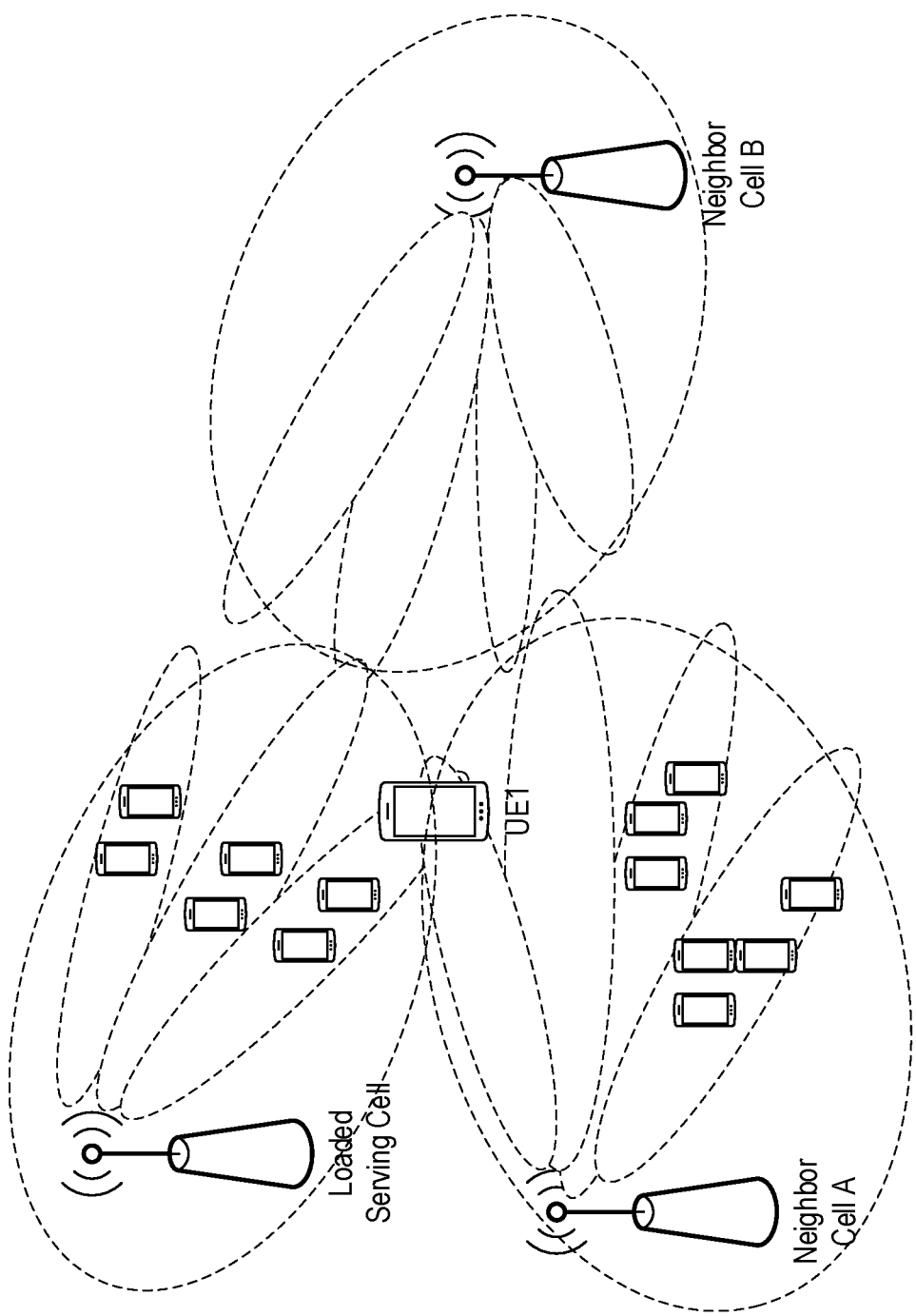
FIG. 11 shows an exemplary scenario involving a non-uniform distribution of UEs within beams of a cell.

As discussed above, the load distribution among the beams of a cell may be non-uniform, and can even vary significantly. FIG. 11 shows an exemplary scenario involving a non-uniform distribution of UEs within beams of a cell. In this example, a serving cell is highly loaded at least in an area corresponding to the three beams shown. In addition, a neighbour cell A is highly loaded in two beams but unloaded in two other beams.

A served UE-1 reports measurements (possibly including beam measurements) indicating that a neighbour cell A is detected with good radio condition. UE-1 also reports another neighbour cell B that is more distant than neighbour cell A. The serving node may then request the neighbour cell A to provide its load conditions. According to conventional techniques, the node serving neighbour cell A will indicate a relatively high load in cell A, as at least the same number of UEs and same traffic as in the serving cell itself. This can lead the serving node to conclude that neighbour cell A is overloaded, although cell A has sufficient capacity to accept UE-1 in the beam(s) covering UE-1's current location. Based on this determination, the serving node may offload UE-1 to neighbour cell B instead, which can result in unacceptable and/or undesirable radio conditions for UE-1.

Exemplary embodiments of the present disclosure address these and other problems, challenges, and/or issues by providing specific enhancements and/or improvements to mobility load balancing (MLB) in wireless communication networks. In general, exemplary embodiments include techniques and/or mechanisms that facilitate MLB between a source node and a target node on a per-beam basis, thereby avoiding and/or overcoming various challenges, problems, and/or drawbacks experienced by conventional per-cell MLB.

According to various embodiments, a source node can exchange beam-level load information (e.g., report) with a target candidate node. The source node can also obtain per-beam measurement reports, from one or more UEs, for a cell served by the target candidate node, and correlate this measurement information with per-beam load information of the target candidate node. Furthermore, the source node can decide whether to perform a load-triggered handover towards a specific beam or group of beams of the target candidate node based on the beam-level load report from the target candidate node and, optionally, the measurement reports from the UE(s). This can also involve determining the target beam or group of beams from among the beams transmitted by the target candidate node.

In some embodiments, a dedicated procedure for handover offset exchange can be used prior to performing the mobility (e.g., handover) procedure. For example, this can include the source node triggering a signaling exchange (referred to as "Mobility Settings Change" or "Handover Setting Change") with the potential target node, by which the source node communicates a change in one or more handover offsets ΔHO applied by the source node for mobility of UE(s) from its serving cell or beam to the target node beams that are considered most likely handover candidates. Such handover offsets ΔHO can be beam- or beam-group-specific, for the target node to use in relation to one or more beams of the source node. For example, after MLB-based handover of such UEs to the target cell or beam, the target node can apply ΔHO when such UEs perform a mobility operation (e.g., handover) from the target cell or beam to a source cell or beam (e.g., the source cell or beam from which they originated). In this manner, UE ping-ponging between source and target cells can be avoided and/or reduced.

In other embodiments, handover offset exchange can be incorporated into the handover procedure itself. In such embodiments, the handover request may contain a beam- or beam-group-specific handover offset ΔHO for the target network node to use in relation to one or more beams of the source network node. For example, the Handover Request message can include a target beam or group of beams for handover, along with one or more of the following:

Information identifying a particular UE or group of UEs to be handed over to the target beam or group of beams; and Expected load to be handed over, the expected resources or capacity to be needed at the target node to serve UEs being handed over, the type of traffic to be handed over, the network slice(s) associated with the traffic/UEs to be handed over, etc.

In such embodiments, the source node can receive a Handover Request Acknowledge message from the target network node including beam-level information to be sent to the UE as an RRC message to perform the handover. This beam-level information may comprise beam-level measurement configuration information for beams in the target network node.

In some embodiments, ΔHO can be specific to the UEs that are handed over. In other embodiments, ΔHO can be applied to all UEs in the indicated beams of the target network node. In some embodiments, ΔHO can be defined as $\Delta HO_j$, which is specific to one or more specific beams j in the target network node with respect to all beams in the source network node (e.g., the entire cell served by the source network node). In other embodiments, ΔHO can be defined as $\Delta HO_{ij}$, which is specific to one or more specific beams j in the target network node with respect to one or more specific beams i in the source network node.

According to various embodiments, a target node can report its per-beam load-related information to enable a source node to take educated MLB decisions based on spatial distribution of load and/or available capacity. In case of the NR RAT, such load related information is collected at the gNB-DU (distributed units) and signaled on a per beam basis to the gNB-CU (centralized unit) over the F1 interface.

Furthermore, in various embodiments, a target node can respond to a request from the source node to modify the handover offset ΔHO with a beam level granularity, either before or after a handover procedure for load balancing reasons. Such response may either accept the proposed configuration of one or more handover offset ΔHO proposed by the source node, or it may include a new configuration of the one or more handover offset ΔHO' suggested by the target node.

In addition, in various embodiments, a target node can receive a Handover Request message from the source network node indicating a target beam or group of beams for MLB handover. In response, the target node can transmit a a Handover Request Acknowledge message to the source node including beam-level information for performing the handover, to be sent to the UE as an RRC message.

Figure 12:
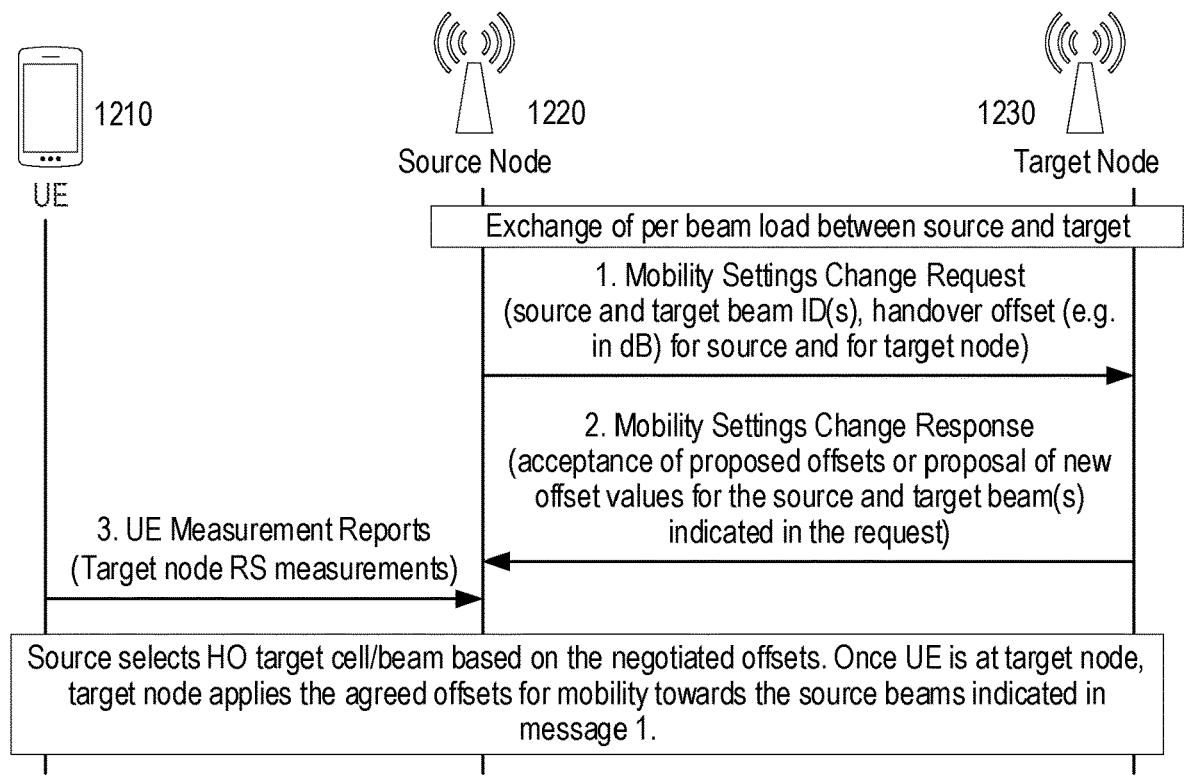
FIG. 12 shows a signaling flow of a dedicated procedure for handover offset exchange, according to various exemplary embodiments of the present disclosure.

FIG. 12 shows a signaling flow of a dedicated procedure for handover offset exchange, according to various exemplary embodiments of the present disclosure. As shown in FIG. 12, source node 1220 and target node 1230 exchange per beam load information. If the node (source or target) is a gNB comprised of a gNB-DU and a gNB-CU, the load information can be generated by the gNB-DU and signaled to the gNB-CU. The gNB-CU then signals this information to the neighbor node (source or target). After exchange of per-beam load, source node 1220 sends a Mobility Settings Change Request message ("1") to target node 1230. This message can include a list of one or more source cell beam identifiers (IDs). Such IDs may refer to specific data channel beams (also known as "link beams") or reference signal beams. The source node also signals a list of one or more target cell beam IDs, e.g., for data channel beams or reference signal beams.

Source node 1220 also indicates one or more ΔHOs to be applied between the source beams and the target beams. If one ΔHO is signaled, then the offset, which can be expressed in dB, applies to mobility trigger events between each of the source beams and target beam. Alternatively the message may contain one ΔHO for each pair of source and target beam or one ΔHO for mobility from the source beam to one or more target beams. For example, such offset(s) can be or represent a value, e.g., in dB, to be added to or subtracted from the signal strength of the source beam or target beam when evaluating if the mobility trigger event for handover from source to target has been met.

Target node 1230 replies with a Mobility Settings Change Response ("2"), in which it either accepts ΔHO or proposes a new ΔHO' associated with the source and target beam ID(s) in the request. Subsequently, the source node receives measurements from UE 1210 of target node beams/cells ("3"). Based on these measurements, a mobility triggering event between the specified source beams and target beams (and vice versa, as needed) occurs according to the ΔHOs exchanged. The source node selects a target node beam/cell for UE 1210 handover. After the UE has been handed over, the target node applies the negotiated offsets (ΔHO or ΔHO') for mitigating UE mobility back towards the source beam(s)/cell(s).

Figure 13:
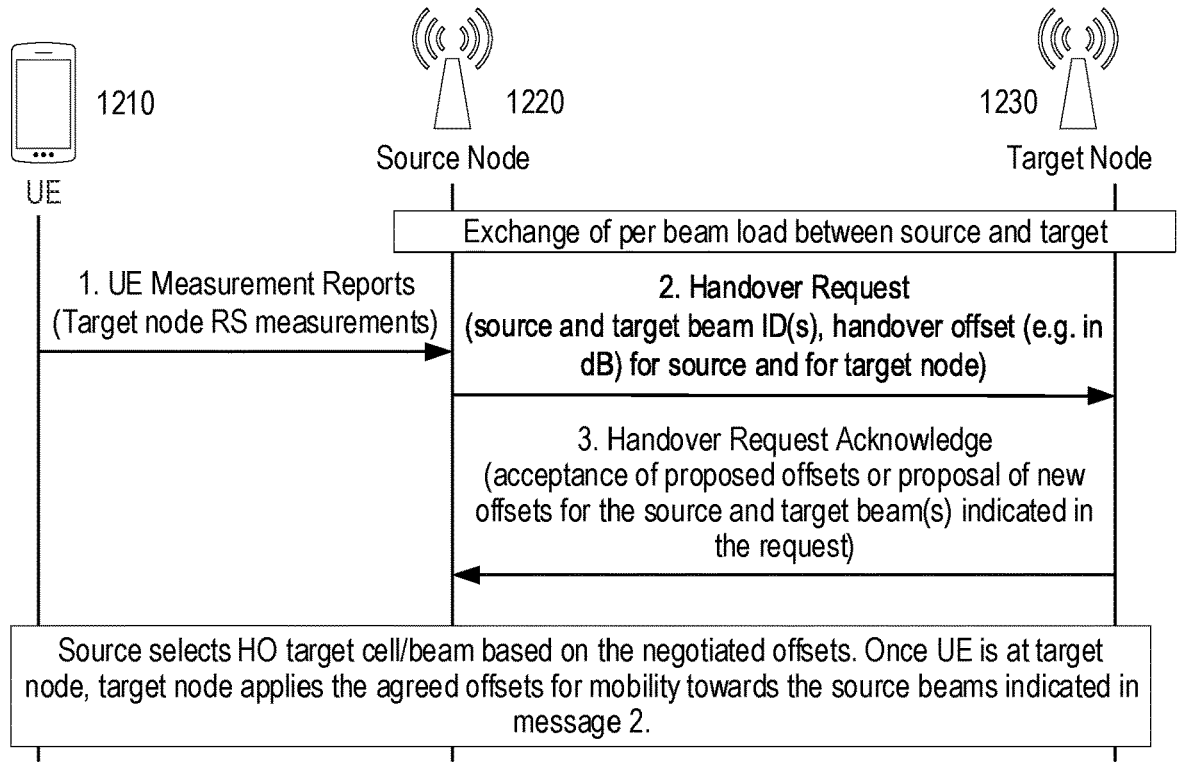
FIG. 13 shows a signaling flow of a handover offset exchange incorporated into the handover procedure, according to various exemplary embodiments of the present disclosure.

FIG. 13 shows a signaling flow of a handover offset exchange incorporated into the handover procedure, according to various exemplary embodiments of the present disclosure. This procedure is similar to the procedure shown in FIG. 12, with differences including the names of the messages exchanged between the source/target nodes, as well as the fact that handover offset exchange occurs after—rather than before—UE measurement reporting. In further contrast to FIG. 12, the beam-level handover offset(s) ΔHO is/are encapsulated and/or incorporated within the handover request/response messages exchanged during the handover procedure. Reference numbers for the UE, source node, and target node are the same as in FIG. 12.

In the Handover Request Acknowledge message ("3"), the target node can either explicitly accept ΔHO or propose a new ΔHO' associated with the source and target beam ID(s) in the request. In another alternative, if the target node cannot accept the proposed ΔHOs from the source, it can reply with an Handover Preparation Failure message instead of the Handover Request Acknowledge message. In this case the target node can include in the Handover Preparation Failure message a cause value to specify that the failure was due to the fact the target node could not accept the proposed ΔHOs.

Figure 14:
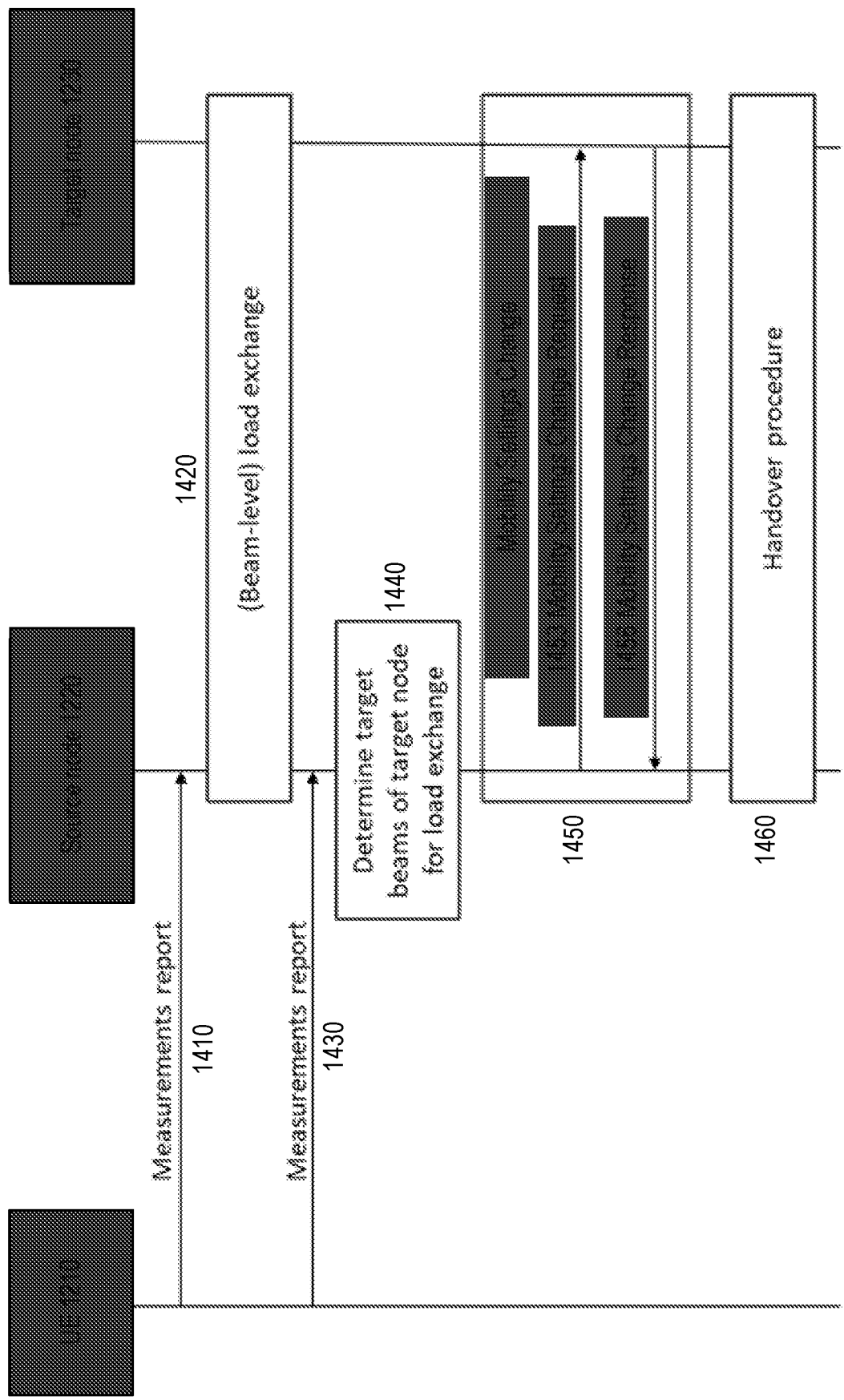
FIG. 14 shows a signaling flow of an exemplary procedure for beam-level MLB in a RAN, according to various exemplary embodiments of the present disclosure.

FIG. 14 shows a signaling flow of an exemplary procedure for beam-level mobility load balancing (MLB) in a RAN, according to various exemplary embodiments of the present disclosure. The exemplary procedure shown in FIG. 14 includes a dedicated procedure for exchanging and/or configuring handover offsets ΔHO on a per-beam basis, or for modifying the handover offsets ΔHO previously configured in this manner. Although the exemplary procedure is illustrated in FIG. 14 by specific operations in a particular order, the operations can be performed in different orders than shown and can be combined and/or divided into blocks and/or operations having different functionality than shown. Furthermore, the exemplary procedure shown in FIG. 14 can be complementary to other exemplary procedures disclosed herein, such that they can be used cooperatively to provide the benefits, advantages, and/or solutions to problems described herein.

Reference numbers for the UE, source node, and target node are the same as in FIG. 12. In operation 1410, the source node receives radio measurements reports from one or more user devices (UEs) within its coverage area (e.g., in a source cell served by the source node) associated to downlink radio beams. For example, these downlink beam measurements can be based on measuring downlink reference signals (e.g., SSB or CSI-RS) transmitted by the source node and neighboring network nodes within the respective associated source cells, source beams, target cells, and/or target beams.

Based on the these reports, the source node can determine the traffic load associated with the coverage area of individual radio beams or groups of radio beams. Traffic load per beam or per beam group can be defined, for instance, in terms of number of users within the coverage area of a beam or beam group, respectively. In addition or as an alternative, traffic load can be defined in terms of resource utilization by users within the coverage area of a beam or beam group. In operation 1420, the source node can exchange beam-level load reports with one or more neighboring nodes to facilitate MLB operations.

The source node may receive further measurement reports from the UEs within its coverage area (operation 1430). Subsequently, in operation 1440, the source node can determine one or more radio beams within one or more cells of a target network node that are suitable for MLB operations. This determination can be based on the radio measurement reports received from UEs, the beam-level load reports received from neighboring target nodes, and the beam-level load for the source node itself. In this manner, the source node can determine not only which cell of a neighboring network node is a suitable candidate to offload UEs, but also determine which radio beams (i.e., coverage areas) of the target network node are suitable, preferred, and/or optimal to serve the UEs that the source node wants to offload to the target node.

In operation 1450, the source node and target node can cooperatively perform a mobility settings change procedure. Within this procedure, the source node can trigger a signaling exchange with the potential target network node to communicate a change in one or more handover offsets ΔHO for UE mobility to be applied to one or more source node beams and/or to one or more beams of the target node that are considered as handover targets. In one exemplifying embodiment shown in FIG. 14, the source node can transmit a Mobility Settings Change Request message (operation 1453) that includes a change in one or more beam-specific or beam-group specific handover offsets ΔHO. The handover offset(s) ΔHO can be associated with a beam or a beam group either in the source node or in the target node.

In some embodiments, the source node can communicate one or more suggested handover offsets ΔHO to be applied by the target node to its served UEs when such UEs perform mobility from target beams (e.g., target beams indicated by the source node) to a cell or beam served by the source node. For example, the handover offset ΔHO can be applied to all UEs in the indicated beams of the target network node to avoid shifting load back to the source network node.

In other embodiments, the source node can communicate one or more suggested handover offsets ΔHO to be applied by the source node to its served UEs when such UEs perform mobility from source beams (e.g., source beams indicated by the source node) to a cell or beam served by the target node. For example, the handover offset ΔHO can be applied to all UEs in the indicated beams of the source network node to avoid shifting load back to the target network node.

Figure 15:
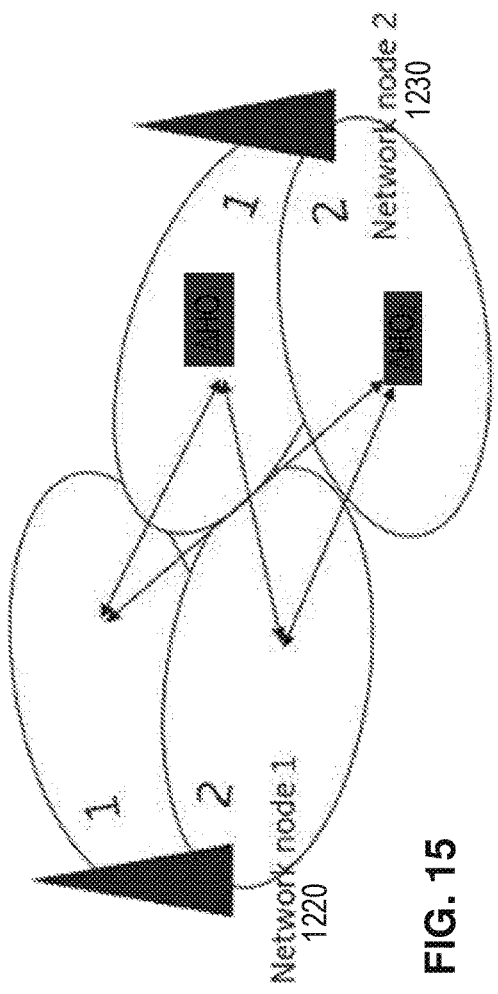
FIGS. 15-16 illustrate two different alternatives for beam-specific handover offsets, according to various exemplary embodiments of the present disclosure.

In some embodiments, ΔHO can be specific to the UEs that are handed over. In other embodiments, ΔHO can be applied to all UEs in the indicated beams of the target network node. In some embodiments, ΔHO can be defined as $\Delta HO_j$, which is specific to one or more particular beams j in the target network node with respect to all beams in the source network node (e.g., the entire cell served by the source network node). Alternately, $\Delta HO_j$ can be specific to one or more beams j in the source network node with respect to all beams in the target node (e.g., the entire cell served by the target node). FIG. 15 illustrates this alternative for group-beam-specific handover offsets, where Network node 2 uses, for each of its beams, a beam-specific offset applicable to all beams of Network node 1.

Figure 16:
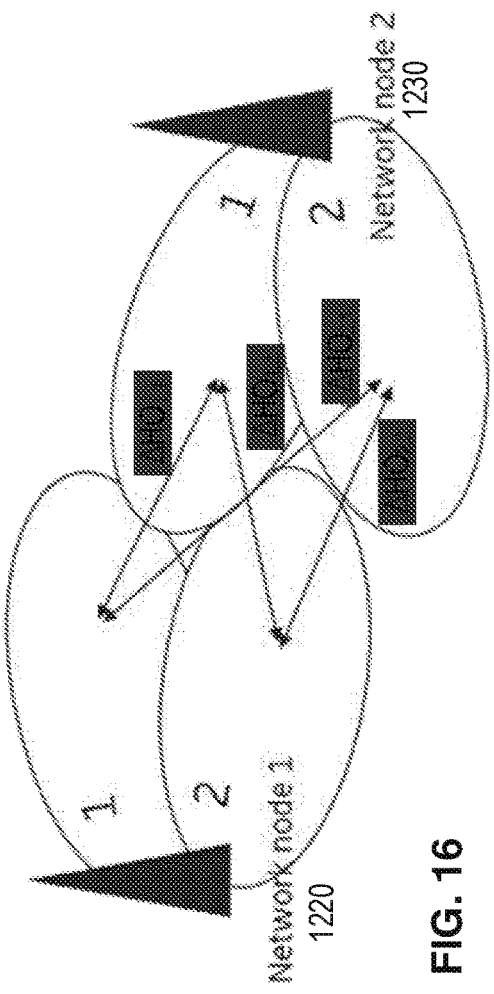

In other embodiments, ΔHO can be defined as $\Delta HO_{ij}$, which is specific to one or more particular beams j in the target node with respect to one or more particular beams i in the source node. Alternately, $\Delta HO_{ij}$ can be specific to one or more beams j in the source node with respect to one or more specific beams i in the target node. FIG. 16 illustrates beam-specific handover offset mapping between source and target nodes, each having two beams. As shown in FIG. 16, this mapping results in a 2×2 grid of four different offsets $\Delta HO_{ij}$.

Returning to FIG. 14, in operation 1456, the source node receives a Mobility Settings Change Response message from the target node. This message may acknowledge the handover offset configuration for a beam or group of beams as signaled by the source network node to the target network node, or it may include a different handover offset configuration determined by the target node. This may be necessary in the case where the target node and the source node have different groups of neighboring nodes. The target node, for instance, may need to balance its load with the source node as well as other nodes that are not visible to the source node (or to the source node's served UEs). The response message in operation 1456 can be used to modify the handover offset associated with beams of the source network node, beams of the target network node, or both.

Once the beam-level handover offset values have been agreed between the source network node and the target network node, UEs can be handed over between beams of the source network node and beams the target network node according to the agreed HO offset values. This is exemplified in FIG. 14 by the handover procedure of operation 1460.

Figure 17:
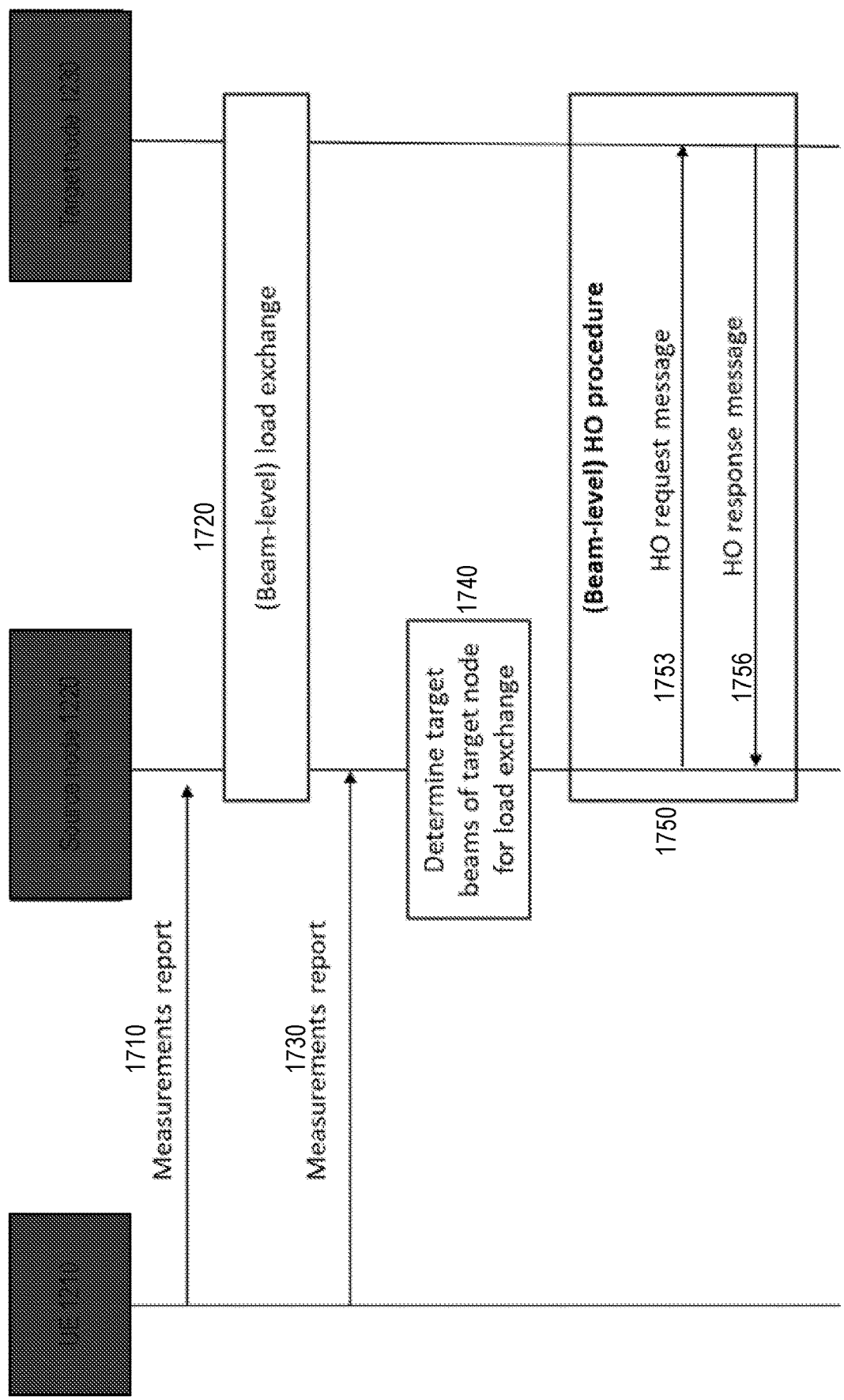
FIG. 17 shows a signaling flow of another exemplary procedure for beam-level MLB in a RAN, according to various exemplary embodiments of the present disclosure.

FIG. 17 shows a signaling flow of another exemplary procedure for beam-level mobility load balancing (MLB) in a RAN, according to various exemplary embodiments of the present disclosure. In contrast to FIG. 14, the beam-level handover offset(s) ΔHO is/are encapsulated and/or incorporated within the handover request/response messages exchanged during a beam-level handover procedure. Although the exemplary procedure is illustrated in FIG. 17 by specific operations in a particular order, the operations can be performed in different orders than shown and can be combined and/or divided into blocks and/or operations having different functionality than shown. Furthermore, the exemplary procedure shown in FIG. 17 can be complementary to other exemplary procedures disclosed herein, such that they can be used cooperatively to provide the benefits, advantages, and/or solutions to problems described herein.

Reference numbers for the UE, source node, and target node are the same as in FIG. 12. Operations 1710-1740 shown in FIG. 17 are substantially similar to respective operations 1410-1440 described above with respect to FIG. 14, so their descriptions will be omitted for conciseness. One notable difference is that, in operation 1740, the source node can determine one or more radio beams within one or more cells of a target node that are suitable for MLB-driven handover of one or more UEs. In operation 1750, the source node and target node can cooperatively perform a handover procedure in accordance with this determination in block 1740.

Within this procedure, the source node can transmit a Handover Request message (operation 1753) to the target node indicating a target beam or group of a beams that are preferred for moving UEs from the source node. The Handover Request can also include one or more handover offsets ΔHO. The handover offsets ΔHO can be associated with a beam (or group of beams) of the target node, a beam (or a group of beams) of the source node, or both. In other words, all of the various embodiments of ΔHO described above with reference to FIG. 14 are equally applicable to the exchange during the handover procedure (operation 1750) shown in FIG. 17.

As such, in various embodiments, the Handover Request message can therefore be regarded as beam- or beam-group-specific. Furthermore, the source node can transmit different Handover Request messages to the target node to trigger handover of UEs from the source node towards different coverage areas of the target node (i.e., to different beams or group of beams).

In some embodiments, the Handover Request message may also include information associated with a specific UE or group of UEs to be handed over to a specific beam or group of beams of the target network node. This can include UE identifiers, UE type identifiers, UE mobility type identifiers (e.g., fast, slow, medium mobility), UE service type identifiers, and/or identifiers of network slice(s) associated with the traffic and/or UEs to be handed over.

In some embodiments, the Handover Request message may also include information to related to the expected load to be handed over, the expected resources or capacity to be needed at the target node to serve the UEs handing over, and/or the type of traffic to be handed over.

In operation 1756, the source node can receive a Handover Response message from the target node, which may include a handover acknowledgment. The Handover Response message may also indicate a preferred configuration for one or more handover offsets ΔHO associated with a beam (or group of beams) of the source node or the target node. In the former case, the target node requests the source network node to modify the handover offset configuration for a beam (or group of beams) of the source network node. In the latter case, the target node informs the source node about the handover offset configuration being used for a beam (or group of beams) of the target network node.

In some embodiments, the Handover Response message may also include beam-level information for beams in the target node, which is provided so that the source node can transmit it to the UEs to be handed over from the source beam/cell. This beam-level information can be, e.g., an RRC message comprising beam-level measurement configuration for beams transmitted by the target node.

Although not shown in FIG. 17, in some embodiments, after a handover procedure for load balancing reasons (e.g., operation 1750), the source node can send a request, to the target node, to modify the handover offset ΔHO with a beam level granularity. The target node can respond in various ways as described above. For example, this request/response can be independent of a Handover procedure for particular UEs, and can utilize similar messages as the Handover Settings Change procedure (operation 1450) shown in FIG. 14.

These embodiments described above can be further illustrated with reference to FIGS. 18-19, which depict exemplary methods (e.g., procedures) performed by a source node and a target node, respectively. In other words, various features of the operations described below with reference to FIGS. 18-19 correspond to various embodiments described above.

Figure 18:
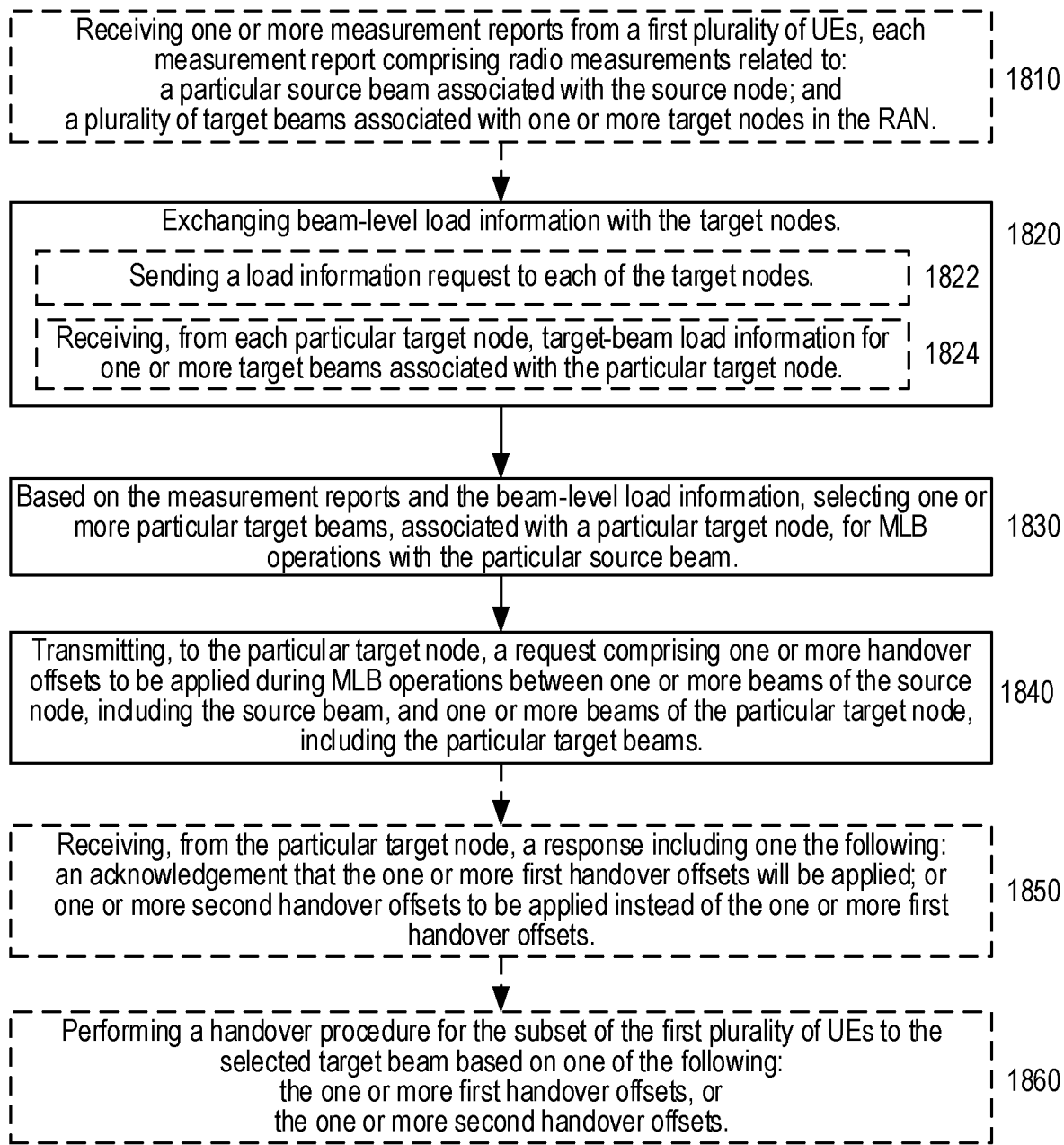
FIG. 18 illustrates an exemplary method (e.g., procedure) performed by a source node in a radio access network (RAN), according to various exemplary embodiments of the present disclosure.

In particular, FIG. 18 illustrates an exemplary method (e.g., procedure) for beam-level mobility load balancing (MLB) in a radio access network (RAN), according to various exemplary embodiments of the present disclosure. The exemplary method can be performed by a source node (e.g., base station, eNB, gNB, etc., or component thereof) in the RAN, serving one or more user equipment (e.g., UE, wireless device, MTC device, NB-IoT device, modem, etc. or component thereof) with one or more beams, such as illustrated in other figures described herein. Although the exemplary method is illustrated in FIG. 18 by specific blocks in a particular order, the operations corresponding to the blocks can be performed in different orders than shown and can be combined and/or divided into blocks having different functionality than shown. Furthermore, the exemplary method shown in FIG. 18 can be complementary to other exemplary methods disclosed herein (e.g., FIG. 19), such that they can be used cooperatively to provide the benefits, advantages, and/or solutions to problems described herein. Optional blocks and/or operations are indicated by dashed lines.

In some embodiments, the exemplary method can include the operations of block 1810, where the source node can receive one or more measurement reports from a plurality of UEs. Each measurement report can include radio measurements related to a particular source beam associated with the source node, and a plurality of target beams associated with one or more target nodes in the RAN. The exemplary method can also include the operations of block 1820, where the source node can exchange beam-level load information with one or more target nodes in the RAN, e.g., the target nodes associated with the target beams identified in the measurement reports. In some embodiments, the exchange of beam-level load information can be triggered by one or more of the radio measurements in the received measurement report(s).

In some embodiments, the exchanging operations of block 1820 can include the operations of sub-blocks 1822-1824. In block 1822, the source node can send a load information request to each of the target nodes. In some embodiments, the load information request to each particular target node can identify one or more target beams for which load information is requested by the source node. In block 1824, the source node can receive, from each particular target node, target-beam load information for one or more target beams associated with the particular target node (e.g., the target beams identified in the load information request). In this manner, the source node can collect and/or receive beam-level load information from the respective target nodes.

The exemplary method can also include the operations of block 1830, where the source node can select one or more particular target beams, associated with a particular target node, for MLB operations with the particular source beam. This selection can be based on the the beam-level load information (e.g., received in block 1820). In embodiments where the source node receives measurement reports related to a plurality of target beams (e.g., in block 1810), the particular target beams can be selected from the plurality of target beams further based on the measurement reports.

The exemplary method can also include the operations of block 1840, where the source node can transmit, to the particular target node, a request including one or more first handover offsets to be applied during MLB operations between: a group of one or more source beams associated with the source node, including the particular source beam; and a group of one or more target beams associated with the particular target node, including the selected target beams. In some embodiments, each beam, of the group of source beams and the group of target beams, can be one of the following: an SS/PBCH block (SSB) beam, a channel state information reference signal (CSI-RS) beam, or a link beam.

In some embodiments, the exemplary method can also include the operations of block 1850, where the source node can receive, from the particular target node, a response including an acknowledgement that the one or more first handover offsets will be applied, or one or more second handover offsets to be applied instead of the one or more first handover offsets.

In some embodiments, the request can be a Handover Request (e.g., a message) for a subset of the first plurality of UEs to the selected target beams, and the response can be a Handover Request Acknowlege message (such as illustrated in FIG. 13) or a Handover Preparation Failure message. In other words, the handover offsets can be sent as part of a handover procedure, such as described above. In such embodiments, the Handover Request message can also include information identifying one or more of the following:
  the subset of UEs;
  the group of target beams, including the selected target beams;
  expected load to be handed over;
  expected resources or capacity needed to serve UEs being handed over;
  type of traffic being handed over; and
  one or more network slices associated with the subset of the first plurality of UEs and/or the type of traffic being handed over.

In some embodiments, the Handover Request Acknowledge message (i.e., the response received in block 1850) can include measurement configuration information, for the subset of the first plurality of UEs, with respect to one or more beams of the particular target node.

In other embodiments, the request (e.g., transmitted in block 1840) can be a Mobility Setting Change Request message and the response can be a Mobility Setting Change Response message (e.g., as illustrated in FIGS. 12 and 14). In these embodiments, the exemplary method can also include the operations of block 1860, where the source node can perform a handover procedure for the subset of the first plurality of UEs to the selected target beam based on the one or more first handover offsets (e.g., based on the response received in block 1850 include an acknowledgement) or the one or more second handover offsets (e.g., based on response including the second handover offsets). This arrangement is also illustrated in FIG. 14.

In some embodiments, the MLB operations (e.g., to which the handover offsets apply) can include a first handover of the subset of UEs from the particular source beam to the selected target beams, and/or a second handover of the subset of UEs back to a cell or beam served by the source node. Put differently, the offsets can apply to handover in either direction, thereby facilitating the avoidance of ping-ponging, as discussed above.

In some embodiments, the one or more first handover offsets can include one or more of the following:
  a handover offset specific to a first beam of the group of target beams (e.g., without being specific to any source beam);
  a handover offset specific to the group of target beams (e.g., without being specific to any source beam);
  a handover offset specific to the group of target beams and to a second beam of the group of source beams;
  a handover offset specific to a first beam from the group of target beams and to a second beam of the group of source beams; and
  a handover offset specific to the subset of UEs.

Figure 19:
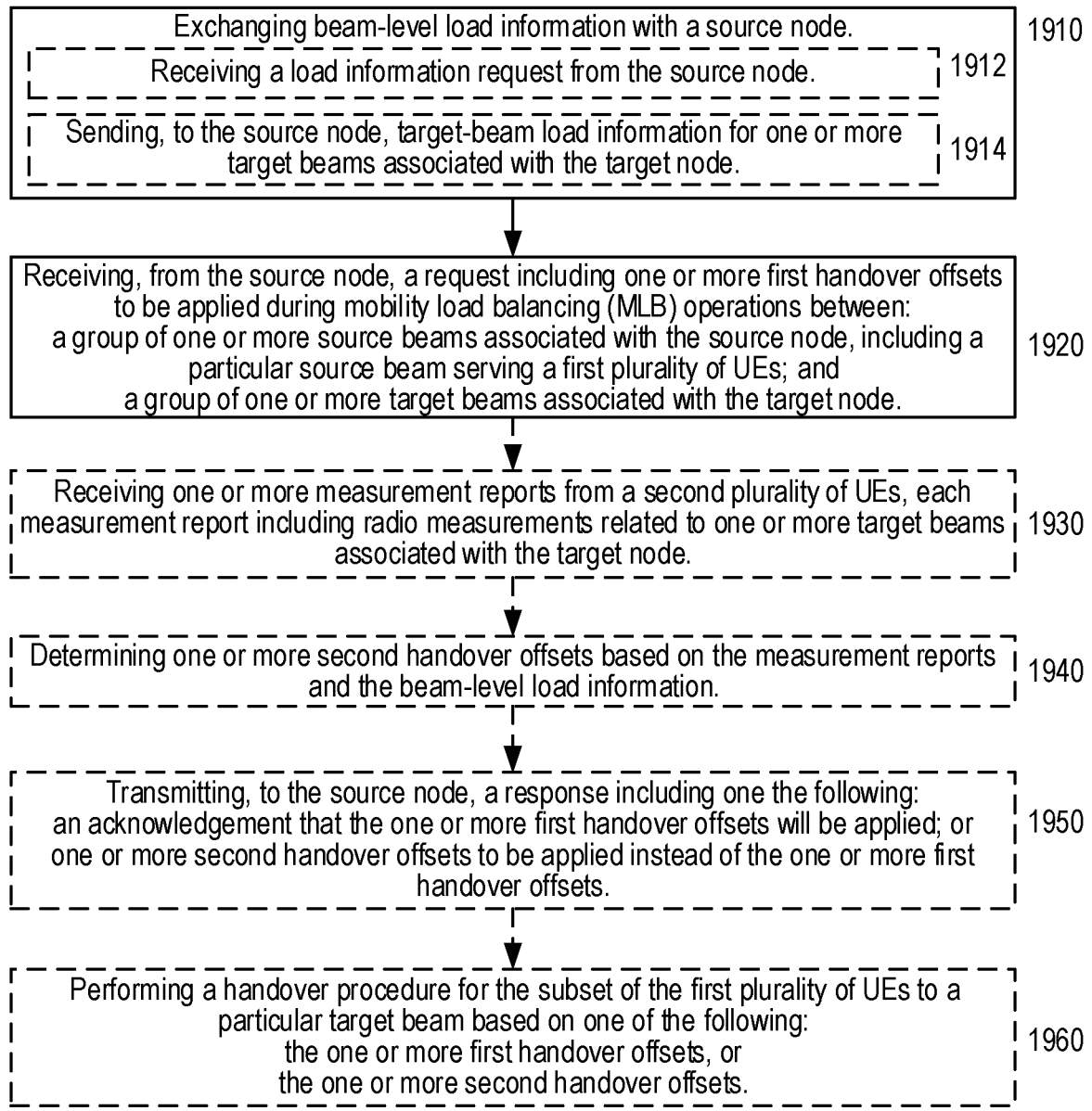
FIG. 19 illustrates an exemplary method (e.g., procedure) performed by a target node in a RAN, according to various exemplary embodiments of the present disclosure.

In addition, FIG. 19 illustrates another exemplary method (e.g., procedure) for beam-level mobility load balancing (MLB) in a radio access network (RAN), according to various exemplary embodiments of the present disclosure. The exemplary method shown in FIG. 19 can be performed by a target node (e.g., base station, eNB, gNB, etc., or component thereof) in the RAN that utilizes beams to communicate with UEs, such as illustrated in other figures described herein. Although the exemplary method is illustrated in FIG. 19 by specific blocks in a particular order, the operations corresponding to the blocks can be performed in different orders than shown and can be combined and/or divided into blocks having different functionality than shown. Furthermore, the exemplary method shown in FIG.

19 can be complementary to other exemplary methods disclosed herein (e.g., FIG. 18), such that they can be used cooperatively to provide the benefits, advantages, and/or solutions to problems described herein. Optional blocks and/or operations are indicated by dashed lines.

The exemplary method can include the operations of block 1910, where the target node can exchange beam-level load information with a source node. In some embodiments, the exchanging operations of block 1910 can include the operations of sub-blocks 1912-1914. In sub-block 1912, the target node can receive a load information request from the source node. In some embodiments, the load information request from the source node can identify one or more target beams for which load information is requested by the source node. In sub-block 1914, the target node can send, to the source node, target-beam load information for one or more target beams associated with the target node (e.g., the target beams identified in the load information request). In this manner, the source node can collect and/or receive beam-level load information from the target node.

The exemplary method can also include the operations of block 1920, where the target node can receive, from the source node, a request including one or more first handover offsets to be applied during MLB operations between a group of one or more source beams associated with the source node, including particular source beam serving a first plurality of UEs; and a group of one or more target beams associated with the target node.

In some embodiments, the exemplary method can also include the operations of block 1930, where the target node can receive one or more measurement reports from a second plurality of UEs (e.g., UEs served by the target node), each measurement report including radio measurements related to one or more target beams associated with the target node. In such embodiments, the exemplary method can also include the operations of block 1940, where the target node can determine, based on the measurement reports and the beam-level load information, one or more second handover offsets to be applied instead of the one or more first handover offsets (e.g., received in block 1920).

In some embodiments, the exemplary method can also include the operations of block 1950, where the target node can transmit, to the source node, a response including an acknowledgement that the one or more first handover offsets will be applied, or one or more second handover offsets (e.g., determined in block 1940) to be applied instead of the one or more first handover offsets.

In some embodiments, the request can be a Handover Request (e.g., a message) for a subset of the first plurality of UEs to the selected target beams, and the response can be a Handover Request Acknowlege message (such as illustrated in FIG. 13) or a Handover Preparation Failure message. In other words, the handover offsets can be sent as part of a handover procedure, such as described above. In such embodiments, the Handover Request message can also include information identifying one or more of the following:
the subset of UEs;
the group of target beams, including the selected target beams;
expected load to be handed over;
expected resources or capacity needed to serve UEs being handed over;
type of traffic being handed over; and
one or more network slices associated with the subset of the first plurality of UEs and/or the type of traffic being handed over.

In some embodiments, the Handover Request Acknowledge message (i.e., the response transmitted in block 1950) can include measurement configuration information, for the subset of the first plurality of UEs, with respect to one or more beams of the target node.

In other embodiments, the request (e.g., received in block 1920) can be a Mobility Setting Change Request message and the response can be a Mobility Setting Change Response message (e.g., as illustrated in FIGS. 12 and 14). In these embodiments, the exemplary method can also include the operations of block 1960, where the target node can perform a handover procedure for the subset of the first plurality of UEs to the particular target beam based on the one or more first handover offsets (e.g., based on the response transmitted in block 1950 including an acknowledgement) or the one or more second handover offsets (e.g., based on response including the second handover offsets). This arrangement is also illustrated in FIG. 14.

In some embodiments, the MLB operations (e.g., to which the handover offsets apply) can include a first handover of UEs from the particular source beam to the particular target beam, and/or a second handover of UEs back to a cell or beam served by the source node. Put differently, the offsets can apply to handover in either direction, thereby facilitating the avoidance of ping-ponging, as discussed above.

In some embodiments, the first handover offsets can include one or more of the following:
a handover offset specific to a first beam of the group of target beams (e.g., without being specific to any source beam);
a handover offset specific to the group of target beams (e.g., without being specific to any source beam);
a handover offset specific to the group of target beams and to a second beam of the group of source beams;
a handover offset specific to a first beam from the group of target beams and to a second beam of the group of source beams; and
a handover offset specific to the subset of UEs.

In some embodiments, each beam, of the particular source beam and the plurality of target beams, can be one of the following: an SS/PBCH block (SSB) beam, a channel state information reference signal (CSI-RS) beam, or a link beam.

Figure 20:
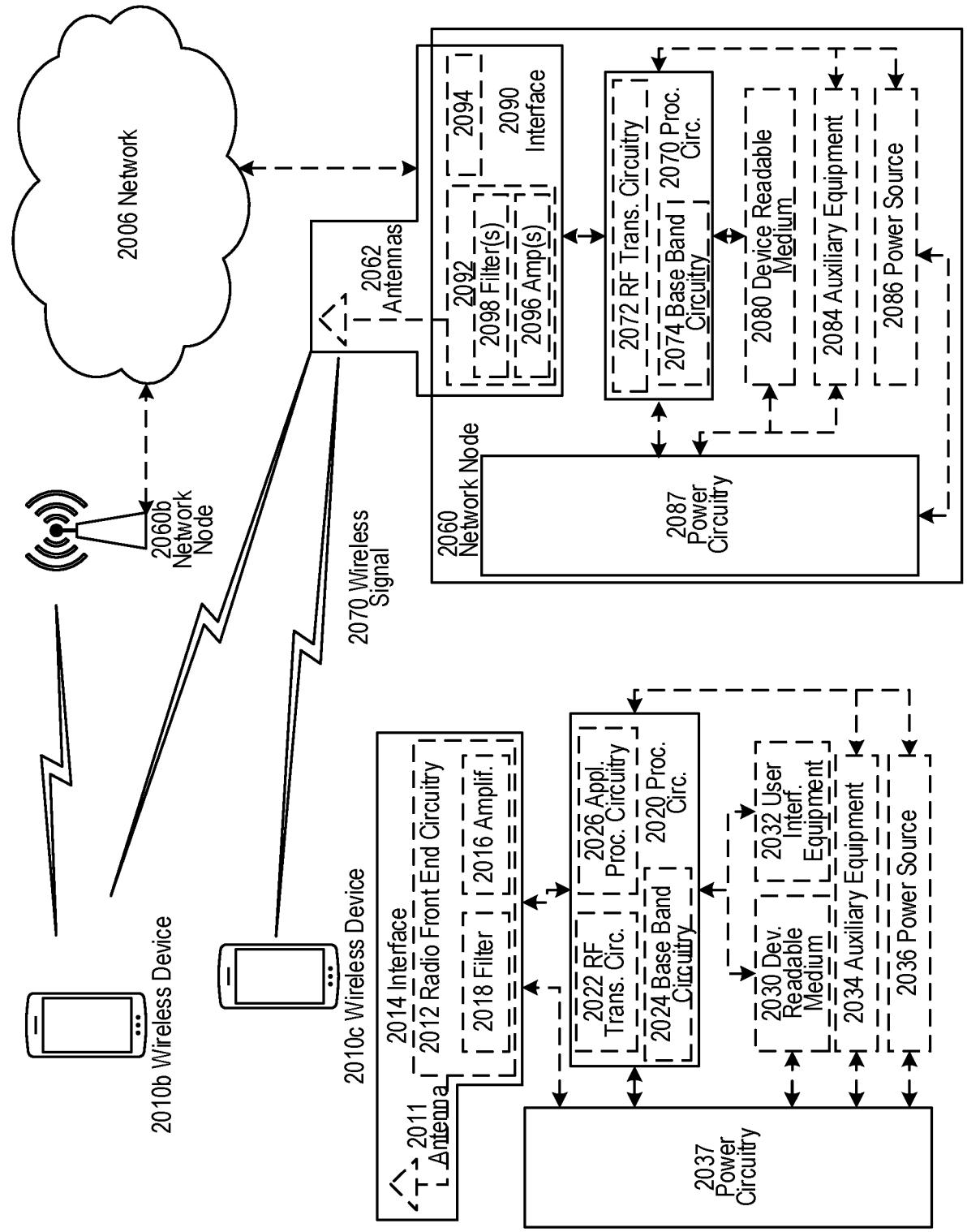
FIG. 20 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 20. For simplicity, the wireless network of FIG. 20 only depicts network 2006, network nodes 2060 and 2060b, and WDs 2010, 2010b, and 2010c. In practice, a wireless network can further include any additional elements suitable to support communication between wireless devices or between a wireless device and another communication device, such as a landline telephone, a service provider, or any other network node or end device. Of the illustrated components, network node 2060 and wireless device (WD) 2010 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2006 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2060 and WD 2010 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 20, network node 2060 includes processing circuitry 2070, device readable medium 2080, interface 2090, auxiliary equipment 2084, power source 2086, power circuitry 2087, and antenna 2062. Although network node 2060 illustrated in the example wireless network of FIG. 20 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 2060 are depicted as single boxes located within a larger box, or nested within multiple boxes, in practice, a network node can comprise multiple different physical components that make up a single illustrated component (e.g., device readable medium 2080 can comprise multiple separate hard drives as well as multiple RAM modules).

Similarly, network node 2060 can be composed of multiple physically separate components (e.g., a NodeB component and a RNC component, or a BTS component and a BSC component, etc.), which can each have their own respective components. In certain scenarios in which network node 2060 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 2060 can be configured to support multiple radio access technologies (RATs). In such embodiments, some components can be duplicated (e.g., separate device readable medium 2080 for the different RATs) and some components can be reused (e.g., the same antenna 2062 can be shared by the RATs). Network node 2060 can also include multiple sets of the various illustrated components for different wireless technologies integrated into network node 2060, such as, for example, GSM, WCDMA, LTE, NR, WiFi, or Bluetooth wireless technologies. These wireless technologies can be integrated into the same or different chip or set of chips and other components within network node 2060.

Processing circuitry 2070 can be configured to perform any determining, calculating, or similar operations (e.g., certain obtaining operations) described herein as being provided by a network node. These operations performed by processing circuitry 2070 can include processing information obtained by processing circuitry 2070 by, for example, converting the obtained information into other information, comparing the obtained information or converted information to information stored in the network node, and/or performing one or more operations based on the obtained information or converted information, and as a result to of said processing making a determination.

Processing circuitry 2070 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2060 components, such as device readable medium 2080, network node 2060 functionality. Such functionality can include providing any of the various wireless features, functions, or benefits discussed herein.

For example, processing circuitry 2070 can execute instructions stored in device readable medium 2080 or in memory within processing circuitry 2070. In some embodiments, processing circuitry 2070 can include a system on a chip (SOC). As a more specific example, instructions (also referred to as a computer program product) stored in medium 2080 can include instructions that, when executed by processing circuitry 2070, can configure network node 2060 to perform operations corresponding to various exemplary methods (e.g., procedures) described herein.

In some embodiments, processing circuitry 2070 can include one or more of radio frequency (RF) transceiver circuitry 2072 and baseband processing circuitry 2074. In some embodiments, radio frequency (RF) transceiver circuitry 2072 and baseband processing circuitry 2074 can be on separate chips (or sets of chips), boards, or units, such as radio units and digital units. In alternative embodiments, part or all of RF transceiver circuitry 2072 and baseband processing circuitry 2074 can be on the same chip or set of chips, boards, or units In certain embodiments, some or all of the functionality described herein as being provided by a network node, base station, eNB or other such network device can be performed by processing circuitry 2070 executing instructions stored on device readable medium 2080 or memory within processing circuitry 2070. In alternative embodiments, some or all of the functionality can be provided by processing circuitry 2070 without executing instructions stored on a separate or discrete device readable medium, such as in a hard-wired manner. In any of those embodiments, whether executing instructions stored on a device readable storage medium or not, processing circuitry 2070 can be configured to perform the described functionality. The benefits provided by such functionality are not limited to processing circuitry 2070 alone or to other components of network node 2060, but are enjoyed by network node 2060 as a whole, and/or by end users and the wireless network generally.

Device readable medium 2080 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 2070. Device readable medium 2080 can store any suitable instructions, data or information, including a computer program, software, an application including one or more of logic, rules, code, tables, etc. and/or other instructions capable of being executed by processing circuitry 2070 and, utilized by network node 2060. Device readable medium 2080 can be used to store any calculations made by processing circuitry 2070 and/or any data received via interface 2090. In some embodiments, processing circuitry 2070 and device readable medium 2080 can be considered to be integrated.

Interface 2090 is used in the wired or wireless communication of signalling and/or data between network node 2060, network 2006, and/or WDs 2010. As illustrated, interface 2090 comprises port(s)/terminal(s) 2094 to send and receive data, for example to and from network 2006 over a wired connection. Interface 2090 also includes radio front end circuitry 2092 that can be coupled to, or in certain embodiments a part of, antenna 2062. Radio front end circuitry 2092 comprises filters 2098 and amplifiers 2096. Radio front end circuitry 2092 can be connected to antenna 2062 and processing circuitry 2070. Radio front end circuitry can be configured to condition signals communicated between antenna 2062 and processing circuitry 2070. Radio front end circuitry 2092 can receive digital data that is to be sent out to other network nodes or WDs via a wireless connection. Radio front end circuitry 2092 can convert the digital data into a radio signal having the appropriate channel and bandwidth parameters using a combination of filters 2098 and/or amplifiers 2096. The radio signal can then be transmitted via antenna 2062. Similarly, when receiving data, antenna 2062 can collect radio signals which are then converted into digital data by radio front end circuitry 2092. The digital data can be passed to processing circuitry 2070. In other embodiments, the interface can comprise different components and/or different combinations of components.

In certain alternative embodiments, network node 2060 may not include separate radio front end circuitry 2092, instead, processing circuitry 2070 can comprise radio front end circuitry and can be connected to antenna 2062 without separate radio front end circuitry 2092. Similarly, in some embodiments, all or some of RF transceiver circuitry 2072 can be considered a part of interface 2090. In still other embodiments, interface 2090 can include to one or more ports or terminals 2094, radio front end circuitry 2092, and RF transceiver circuitry 2072, as part of a radio unit (not shown), and interface 2090 can communicate with baseband processing circuitry 2074, which is part of a digital unit (not shown).

Antenna 2062 can include one or more antennas, or antenna arrays, configured to send and/or receive wireless signals. Antenna 2062 can be coupled to radio front end circuitry 2090 and can be any type of antenna capable of transmitting and receiving data and/or signals wirelessly. In some embodiments, antenna 2062 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 2062 can be separate from network node 2060 and can be connectable to network node 2060 through an interface or port.

Antenna 2062, interface 2090, and/or processing circuitry 2070 can be configured to perform any receiving operations and/or certain obtaining operations described herein as being performed by a network node. Any information, data and/or signals can be received from a wireless device, another network node and/or any other network equipment. Similarly, antenna 2062, interface 2090, and/or processing circuitry 2070 can be configured to perform any transmitting operations described herein as being performed by a network node. Any information, data and/or signals can be transmitted to a wireless device, another network node and/or any other network equipment.

Power circuitry 2087 can comprise, or be coupled to, power management circuitry and can be configured to supply the components of network node 2060 with power for performing the functionality described herein. Power circuitry 2087 can receive power from power source 2086. Power source 2086 and/or power circuitry 2087 can be configured to provide power to the various components of network node 2060 in a form suitable for the respective components (e.g., at a voltage and current level needed for each respective component). Power source 2086 can either be included in, or external to, power circuitry 2087 and/or network node 2060. For example, network node 2060 can be connectable to an external power source (e.g., an electricity outlet) via an input circuitry or interface such as an electrical cable, whereby the external power source supplies power to power circuitry 2087. As a further example, power source 2086 can comprise a source of power in the form of a battery or battery pack which is connected to, or integrated in, power circuitry 2087. The battery can provide backup power should the external power source fail. Other types of power sources, such as photovoltaic devices, can also be used.

Alternative embodiments of network node 2060 can include additional components beyond those shown in FIG. 20 that can be responsible for providing certain aspects of the network node's functionality, including any of the functionality described herein and/or any functionality necessary to support the subject matter described herein. For example, network node 2060 can include user interface equipment to allow and/or facilitate input of information into network node 2060 and to allow and/or facilitate output of information from network node 2060. This can allow and/or facilitate a user to perform diagnostic, maintenance, repair, and other administrative functions for network node 2060.

In some embodiments, a WD (e.g., WD 2010) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop (WLL) phones, desktop computers, personal digital assistants (PDAs), wireless cameras, gaming consoles or devices, music storage devices, playback appliances, wearable terminal devices (e.g., smart watches), wireless endpoints, mobile stations, tablets, laptops, laptop-embedded equipment (LEE), laptop-mounted equipment (LME), smart devices, wireless customer-premise equipment (CPE), vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can to represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 2010 includes antenna 2011, interface 2014, processing circuitry 2020, device readable medium 2030, user interface equipment 2032, auxiliary equipment 2034, power source 2036 and power circuitry 2037. WD 2010 can include multiple sets of one or more of the illustrated components for different wireless technologies supported by WD 2010, such as, for example, GSM, WCDMA, LTE, NR, WiFi, WiMAX, or Bluetooth wireless technologies, just to mention a few. These wireless technologies can be integrated into the same or different chips or set of chips as other components within WD 2010.

Antenna 2011 can include one or more antennas or antenna arrays, configured to send and/or receive wireless signals, and is connected to interface 2014. In certain alternative embodiments, antenna 2011 can be separate from WD 2010 and be connectable to WD 2010 through an interface or port. Antenna 2011, interface 2014, and/or processing circuitry 2020 can be configured to perform any receiving or transmitting operations described herein as being performed by a WD. Any information, data and/or signals can be received from a network node and/or another WD. In some embodiments, radio front end circuitry and/or antenna 2011 can be considered an interface.

As illustrated, interface 2014 comprises radio front end circuitry 2012 and antenna 2011. Radio front end circuitry 2012 comprise one or more filters 2018 and amplifiers 2016. Radio front end circuitry 2014 is connected to antenna 2011 and processing circuitry 2020, and can be configured to condition signals communicated between antenna 2011 and processing circuitry 2020. Radio front end circuitry 2012 can be coupled to or a part of antenna 2011. In some embodiments, WD 2010 may not include separate radio front end circuitry 2012; rather, processing circuitry 2020 can comprise radio front end circuitry and can be connected to antenna 2011. Similarly, in some embodiments, some or all of RF transceiver circuitry 2022 can be considered a part of interface 2014. Radio front end circuitry 2012 can receive digital data that is to be sent out to other network nodes or WDs via a wireless connection. Radio front end circuitry 2012 can convert the digital data into a radio signal having the appropriate channel and bandwidth parameters using a combination of filters 2018 and/or amplifiers 2016. The radio signal can then be transmitted via antenna ix) 2011. Similarly, when receiving data, antenna 2011 can collect radio signals which are then converted into digital data by radio front end circuitry 2012. The digital data can be passed to processing circuitry 2020. In other embodiments, the interface can comprise different components and/or different combinations of components.

Processing circuitry 2020 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2010 components, such as device readable medium 2030, WD 2010 functionality. Such functionality can include providing any of the various wireless features or benefits discussed herein.

For example, processing circuitry 2020 can execute instructions stored in device readable medium 2030 or in memory within processing circuitry 2020 to provide the functionality disclosed herein. As a more specific example, instructions (also referred to as a computer program product) stored in medium 2030 can include instructions that, when executed by processor 2020, can configure wireless device 2010 to perform operations corresponding to various exemplary methods (e.g., procedures) described herein.

As illustrated, processing circuitry 2020 includes one or more of RF transceiver circuitry 2022, baseband processing circuitry 2024, and application processing circuitry 2026. In other embodiments, the processing circuitry can comprise different components and/or different combinations of components. In certain embodiments processing circuitry 2020 of WD 2010 can comprise a SOC. In some embodiments, RF transceiver circuitry 2022, baseband processing circuitry 2024, and application processing circuitry 2026 can be on separate chips or sets of chips. In alternative embodiments, part or all of baseband processing circuitry 2024 and application processing circuitry 2026 can be combined into one chip or set of chips, and RF transceiver circuitry 2022 can be on a separate chip or set of chips. In still alternative embodiments, part or all of RF transceiver circuitry 2022 and baseband processing circuitry 2024 can be on the same chip or set of chips, and application processing circuitry 2026 can be on a separate chip or set of chips. In yet other alternative embodiments, part or all of RF transceiver circuitry 2022, baseband processing circuitry 2024, and application processing circuitry 2026 can be combined in the same chip or set of chips. In some embodiments, RF transceiver circuitry 2022 can be a part of interface 2014. RF transceiver circuitry 2022 can condition RF signals for processing circuitry 2020.

In certain embodiments, some or all of the functionality described herein as being performed by a WD can be provided by processing circuitry 2020 executing instructions stored on device readable medium 2030, which in certain embodiments can be a computer-readable storage medium. In alternative embodiments, some or all of the functionality can be provided by processing circuitry 2020 without executing instructions stored on a separate or discrete device readable storage medium, such as in a hard-wired manner. In any of those particular embodiments, whether executing instructions stored on a device readable storage medium or not, processing circuitry 2020 can be configured to perform the described functionality. The benefits provided by such functionality are not limited to processing circuitry 2020 alone or to other components of WD 2010, but are enjoyed by WD 2010 as a whole, and/or by end users and the wireless network generally.

Processing circuitry 2020 can be configured to perform any determining, calculating, or similar operations (e.g., certain obtaining operations) described herein as being performed by a WD. These operations, as performed by processing circuitry 2020, can include processing information obtained by processing circuitry 2020 by, for example, converting the obtained information into other information, comparing the obtained information or converted information to information stored by WD 2010, and/or performing one or more operations based on the obtained information or converted information, and as a result of said processing making a determination.

Device readable medium 2030 can be operable to store a computer program, software, an application including one or more of logic, rules, code, tables, etc. and/or other instructions capable of being executed by processing circuitry 2020. Device readable medium 2030 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 2020. In some embodiments, processing circuitry 2020 and device readable medium 2030 can be considered to be integrated.

User interface equipment 2032 can include components that allow and/or facilitate a human user to interact with WD 2010. Such interaction can be of many forms, such as visual, audial, tactile, etc. User interface equipment 2032 can be operable to produce output to the user and to allow and/or facilitate the user to provide input to WD 2010. The type of interaction can vary depending on the type of user interface equipment 2032 installed in WD 2010. For example, if WD 2010 is a smart phone, the interaction can be via a touch screen; if WD 2010 is a smart meter, the interaction can be through a screen that provides usage (e.g., the number of gallons used) or a speaker that provides an audible alert (e.g., if smoke is detected). User interface equipment 2032 can include input interfaces, devices and circuits, and output interfaces, devices and circuits. User interface equipment 2032 can be configured to allow and/or facilitate input of information into WD 2010, and is connected to processing circuitry 2020 to allow and/or facilitate processing circuitry 2020 to process the input information. User interface equipment 2032 can include, for example, a microphone, a proximity or other sensor, keys/buttons, a touch display, one or more cameras, a USB port, or other input circuitry. User interface equipment 2032 is also configured to allow and/or facilitate output of information from WD 2010, and to allow and/or facilitate processing circuitry 2020 to output information from WD 2010. User interface equipment 2032 can include, for example, a speaker, a display, vibrating circuitry, a USB port, a headphone interface, or other output circuitry. Using one or more input and output interfaces, devices, and circuits, of user interface equipment 2032, WD 2010 can communicate with end users and/or the wireless network, and allow and/or facilitate them to benefit from the functionality described herein.

Auxiliary equipment 2034 is operable to provide more specific functionality which may not be generally performed by WDs. This can comprise specialized sensors for doing measurements for various purposes, interfaces for additional types of communication such as wired communications etc. The inclusion and type of components of auxiliary equipment 2034 can vary depending on the embodiment and/or scenario.

Power source 2036 can, in some embodiments, be in the form of a battery or battery pack. Other types of power sources, such as an external power source (e.g., an electricity outlet), photovoltaic devices or power cells, can also be used. WD 2010 can further comprise power circuitry 2037 for delivering power from power source 2036 to the various parts of WD 2010 which need power from power source 2036 to carry out any functionality described or indicated herein. Power circuitry 2037 can in certain embodiments comprise power management circuitry. Power circuitry 2037 can additionally or alternatively be operable to receive power from an external power source; in which case WD 2010 can be connectable to the external power source (such as an electricity outlet) via input circuitry or an interface such as an electrical power cable. Power circuitry 2037 can also in certain embodiments be operable to deliver power from an external power source to power source 2036. This can be, for example, for the charging of power source 2036. Power circuitry 2037 can perform any converting or other modification to the power from power source 2036 to make it suitable for supply to the respective components of WD 2010.

Figure 21:
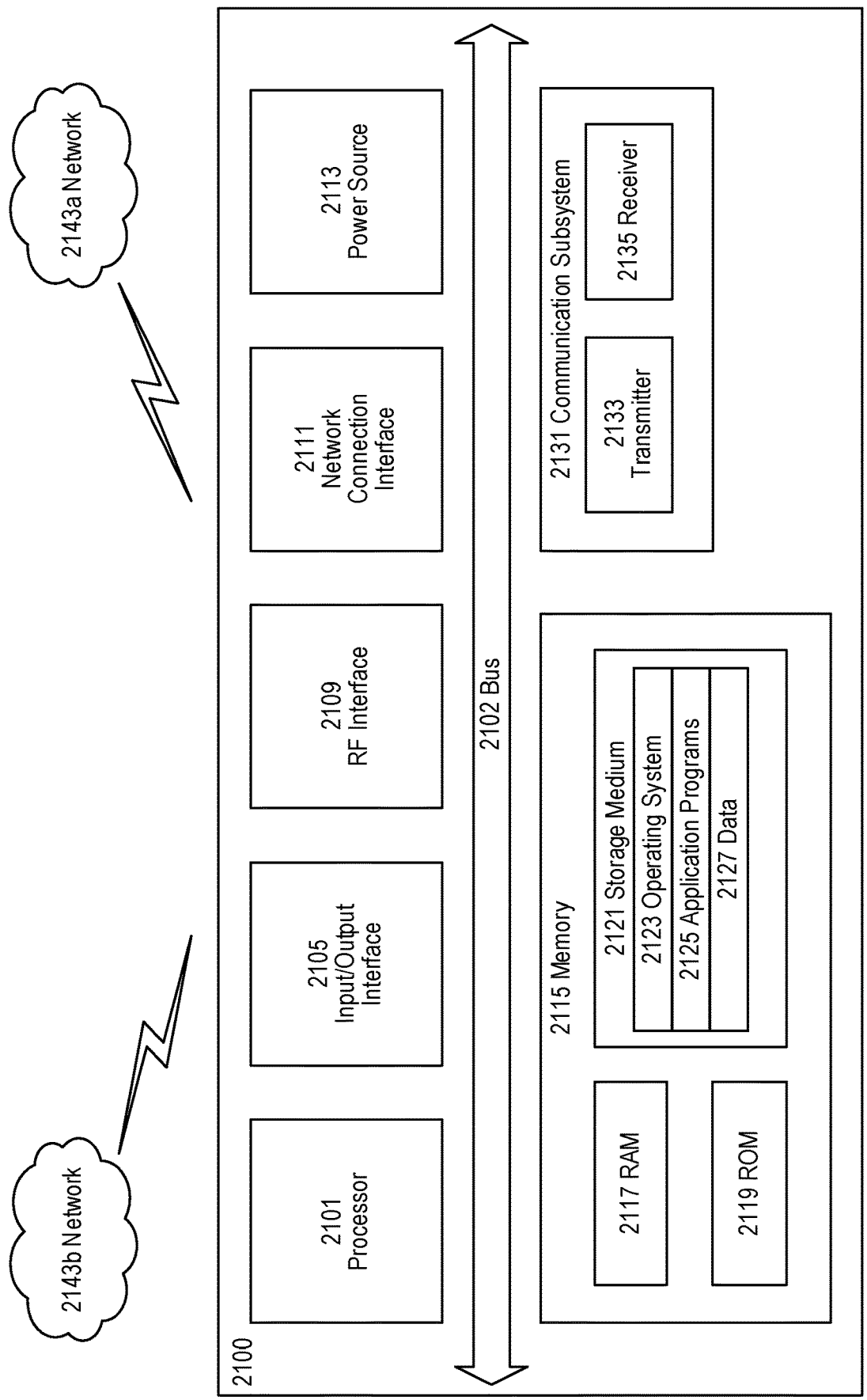
FIG. 21 illustrates an exemplary embodiment of a UE, in accordance with various aspects described herein.

FIG. 21 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to or operation by, an end user but which can be associated with or operated for the benefit of a user (e.g., a smart power meter). UE 21210 can be any UE identified by the $3^{rd}$ Generation Partnership Project (3GPP), including a NB-IoT UE, a machine type communication (MTC) UE, and/or an enhanced MTC (eMTC) UE. UE 2100, as illustrated in FIG. 21, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 21 is a UE, the components discussed herein are equally applicable to a WD, and vice-versa.

In FIG. 21, UE 2100 includes processing circuitry 2101 that is operatively coupled to input/output interface 2105, radio frequency (RF) interface 2109, network connection interface 2111, memory 2115 including random access memory (RAM) 2117, read-only memory (ROM) 2119, and storage medium 2121 or the like, communication subsystem 2131, power source 2133, and/or any other component, or any combination thereof. Storage medium 2121 includes operating system 2123, application program 2125, and data 2127. In other embodiments, storage medium 2121 can include other similar types of information. Certain UEs can utilize all of the components shown in FIG. 21, or only a subset of the components. The level of integration between the components can vary from one UE to another UE. Further, certain UEs can contain multiple instances of a component, such as multiple processors, memories, transceivers, transmitters, receivers, etc.

In FIG. 21, processing circuitry 2101 can be configured to process computer instructions and data. Processing circuitry 2101 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2101 can include two central processing units (CPUs). Data can be information in a form suitable for use by a computer.

In the depicted embodiment, input/output interface 2105 can be configured to provide a communication interface to an input device, output device, or input and output device. UE 2100 can be configured to use an output device via input/output interface 2105. An output device can use the same type of interface port as an input device. For example, a USB port can be used to provide input to and output from UE 2100. The output device can be a speaker, a sound card, a video card, a display, a monitor, a printer, an actuator, an emitter, a smartcard, another output device, or any combination thereof. UE 2100 can be configured to use an input device via input/output interface 2105 to allow and/or facilitate a user to capture information into UE 2100. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 21, RF interface 2109 can be configured to provide a communication interface to RF components such as a transmitter, a receiver, and an antenna. Network connection interface 2111 can be configured to provide a communication interface to network 2143*a*. Network 2143*a* can encompass wired and/or wireless networks such as a local-area network (LAN), a wide-area network (WAN), a computer network, a wireless network, a telecommunications network, another like network or any combination thereof. For example, network 2143*a* can comprise a Wi-Fi network. Network connection interface 2111 can be configured to include a receiver and a transmitter interface used to communicate with one or more other devices over a communication network according to one or more communication protocols, such as Ethernet, TCP/IP, SONET, ATM, or the like. Network connection interface 2111 can implement receiver and transmitter functionality appropriate to the communication network links (e.g., optical, electrical, and the like). The transmitter and receiver functions can share circuit components, software or firmware, or alternatively can be implemented separately.

RAM 2117 can be configured to interface via bus 2102 to processing circuitry 2101 to provide storage or caching of data or computer instructions during the execution of software programs such as the operating system, application programs, and device drivers. ROM 2119 can be configured to provide computer instructions or data to processing circuitry 2101. For example, ROM 2119 can be configured to store invariant low-level system code or data for basic system functions such as basic input and output (I/O), startup, or reception of keystrokes from a keyboard that are stored in a non-volatile memory. Storage medium 2121 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 2121 can be configured to include operating system 2123; application program 2125 such as a web browser application, a widget or gadget engine or another application; and data file 2127. Storage medium 2121 can store, for use by UE 2100, any of a variety of various operating systems or combinations of operating systems. For example, application program 2125 can include executable program instructions (also referred to as a computer program product) that, when executed by processor 2101, can configure UE 2100 to perform operations corresponding to various exemplary methods (e.g., procedures) described herein.

Storage medium 2121 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof Storage medium 2121 can allow and/or facilitate UE 2100 to access computer-executable instructions, application programs or the like, stored on transitory or non-transitory memory media, to off-load data, or to upload data. An article of manufacture, such as one utilizing a communication system can be tangibly embodied in storage medium 2121, which can comprise a device readable medium.

In FIG. 21, processing circuitry 2101 can be configured to communicate with network 2143b using communication subsystem 2131. Network 2143a and network 2143b can be the same network or networks or different network or networks. Communication subsystem 2131 can be configured to include one or more transceivers used to communicate with network 2143b. For example, communication subsystem 2131 can be configured to include one or more transceivers used to communicate with one or more remote transceivers of another device capable of wireless communication such as another WD, UE, or base station of a radio access network (RAN) according to one or more communication protocols, such as IEEE 802.21, CDMA, WCDMA, GSM, LTE, UTRAN, WiMax, or the like. Each transceiver can include transmitter 2133 and/or receiver 2135 to implement transmitter or receiver functionality, respectively, appropriate to the RAN links (e.g., frequency allocations and the like). Further, transmitter 2133 and receiver 2135 of each transceiver can share circuit components, software or firmware, or alternatively can be implemented separately.

In the illustrated embodiment, the communication functions of communication subsystem 2131 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 2131 can include cellular communication, Wi-Fi communication, Bluetooth communication, and GPS communication. Network 2143b can encompass wired and/or wireless networks such as a local-area network (LAN), a wide-area network (WAN), a computer network, a wireless network, a telecommunications network, another like network or any combination thereof. For example, network 2143b can be a cellular network, a Wi-Fi network, and/or a near-field network. Power source 2113 can be configured to provide alternating current (AC) or direct current (DC) power to components of UE 2100.

The features, benefits and/or functions described herein can be implemented in one of the components of UE 2100 or partitioned across multiple components of UE 2100. Further, the features, benefits, and/or functions described herein can be implemented in any combination of hardware, software or firmware. In one example, communication subsystem 2131 can be configured to include any of the components described herein. Further, processing circuitry 2101 can be configured to communicate with any of such components over bus 2102. In another example, any of such components can be represented by program instructions stored in memory that when executed by processing circuitry 2101 perform the corresponding functions described herein. In another example, the functionality of any of such components can be partitioned between processing circuitry 2101 and communication subsystem 2131. In another example, the non-computationally intensive functions of any of such components can be implemented in software or firmware and the computationally intensive functions can be implemented in hardware.

Figure 22:
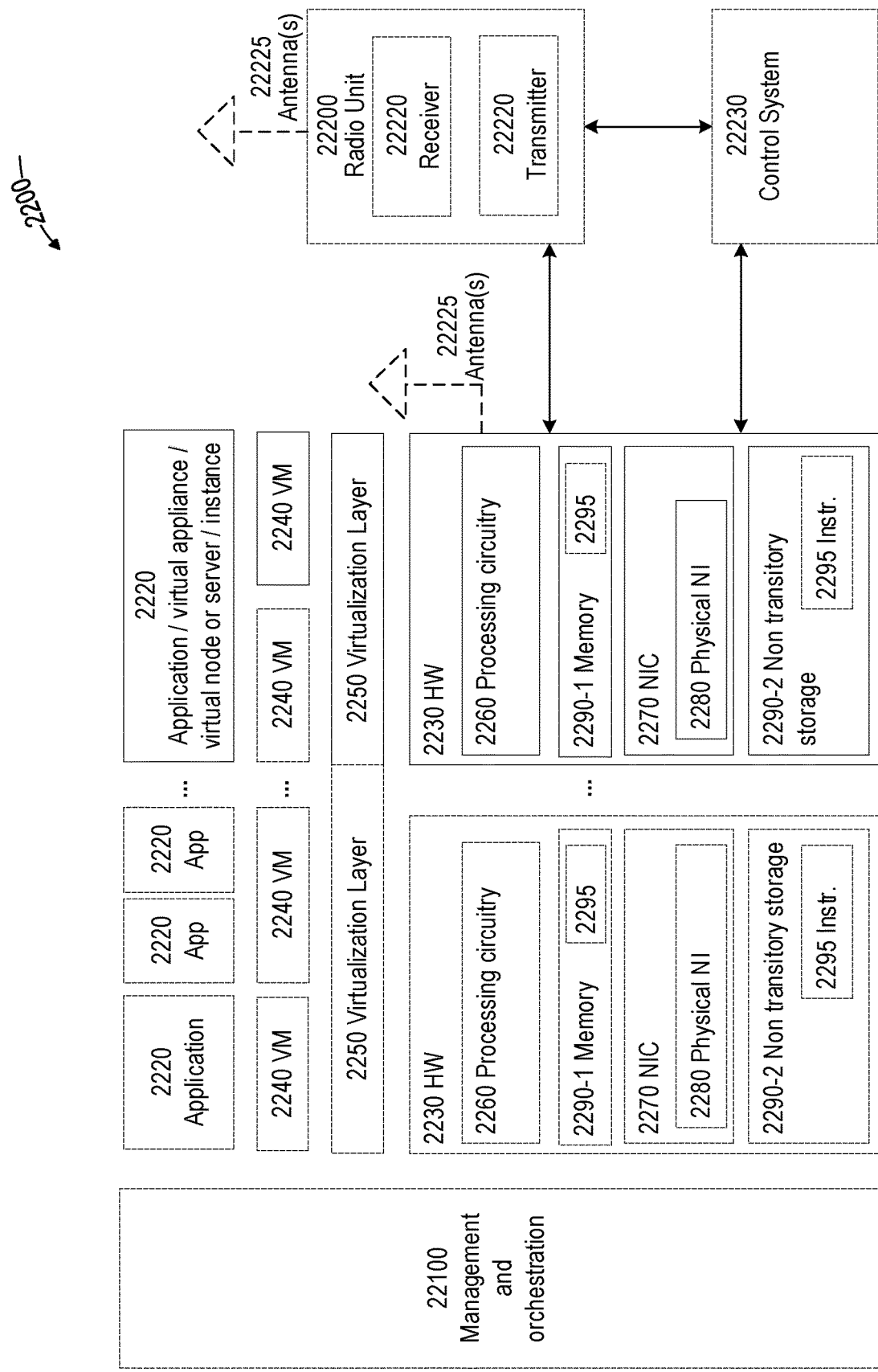
FIG. 22 is a block diagram illustrating an exemplary virtualization environment usable for implementation of various embodiments of network nodes described herein.

FIG. 22 is a schematic block diagram illustrating a virtualization environment 2200 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2200 hosted by one or more of hardware nodes 2230. Further, in embodiments in which the virtual node is not a radio access node or does not require radio connectivity (e.g., a core network node), then the network node can be entirely virtualized.

The functions can be implemented by one or more applications 2220 (which can alternatively be called software instances, virtual appliances, network functions, virtual nodes, virtual network functions, etc.) operative to implement some of the features, functions, and/or benefits of some of the embodiments disclosed herein. Applications 2220 are run in virtualization environment 2200 which provides hardware 2230 comprising processing circuitry 2260 and memory 2290. Memory 2290 contains instructions 2295 executable by processing circuitry 2260 whereby application 2220 is operative to provide one or more of the features, benefits, and/or functions disclosed herein.

Virtualization environment 2200 comprises general-purpose or special-purpose network hardware devices 2230 comprising a set of one or more processors or processing circuitry 2260, which can be commercial off-the-shelf (COTS) processors, dedicated Application Specific Integrated Circuits (ASICs), or any other type of processing circuitry including digital or analog hardware components or special purpose processors. Each hardware device can comprise memory 2290-1 which can be non-persistent memory for temporarily storing instructions 2295 or software executed by processing circuitry 2260. For example, instructions 2295 can include program instructions (also referred to as a computer program product) that, when executed by processing circuitry 2260, can configure hardware node 2220 to perform operations corresponding to various exemplary methods (e.g., procedures) described herein. Such operations can also be attributed to virtual node(s) 2220 that is/are hosted by hardware node 2230.

Each hardware device can comprise one or more network interface controllers (NICs) 2270, also known as network interface cards, which include physical network interface 2280. Each hardware device can also include non-transitory, persistent, machine-readable storage media 2290-2 having stored therein software 2295 and/or instructions executable by processing circuitry 2260. Software 2295 can include any type of software including software for instantiating one or more virtualization layers 2250 (also referred to as hypervisors), software to execute virtual machines 2240 as well as software allowing it to execute functions, features and/or benefits described in relation with some embodiments described herein.

Virtual machines 2240 comprise virtual processing, virtual memory, virtual networking or interface and virtual storage, and can be run by a corresponding virtualization layer 2250 or hypervisor. Different embodiments of the instance of virtual appliance 2220 can be implemented on one or more of virtual machines 2240, and the implementations can be made in different ways.

During operation, processing circuitry 2260 executes software 2295 to instantiate the hypervisor or virtualization layer 2250, which can sometimes be referred to as a virtual machine monitor (VMM). Virtualization layer 2250 can present a virtual operating platform that appears like networking hardware to virtual machine 2240.

As shown in FIG. 22, hardware 2230 can be a standalone network node with generic or specific components. Hardware 2230 can comprise antenna 22225 and can implement some functions via virtualization. Alternatively, hardware 2230 can be part of a larger cluster of hardware (e.g., such as in a data center or customer premise equipment (CPE)) where many hardware nodes work together and are managed via management and orchestration (MANO) 22100, which, among others, oversees lifecycle management of applications 2220.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 2240 can be a software implementation of a physical machine that runs programs as if they were executing on a physical, non-virtualized machine. Each of virtual machines 2240, and that part of hardware 2230 that executes that virtual machine, be it hardware dedicated to that virtual machine and/or hardware shared by that virtual machine with others of the virtual machines 2240, forms a separate virtual network elements (VNE).

Still in the context of NFV, Virtual Network Function (VNF) is responsible for handling specific network functions that run in one or more virtual machines 2240 on top of hardware networking infrastructure 2230 and corresponds to application 2220 in FIG. 22.

In some embodiments, one or more radio units 22200 that each include one or more transmitters 22220 and one or more receivers 22220 can be coupled to one or more antennas 22225. Radio units 22200 can communicate directly with hardware nodes 2230 via one or more appropriate network interfaces and can be used in combination with the virtual components to provide a virtual node with radio capabilities, such as a radio access node or a base station.

In some embodiments, some signalling can be effected with the use of control system 22230 which can alternatively be used for communication between the hardware nodes 2230 and radio units 22200.

Figure 23:
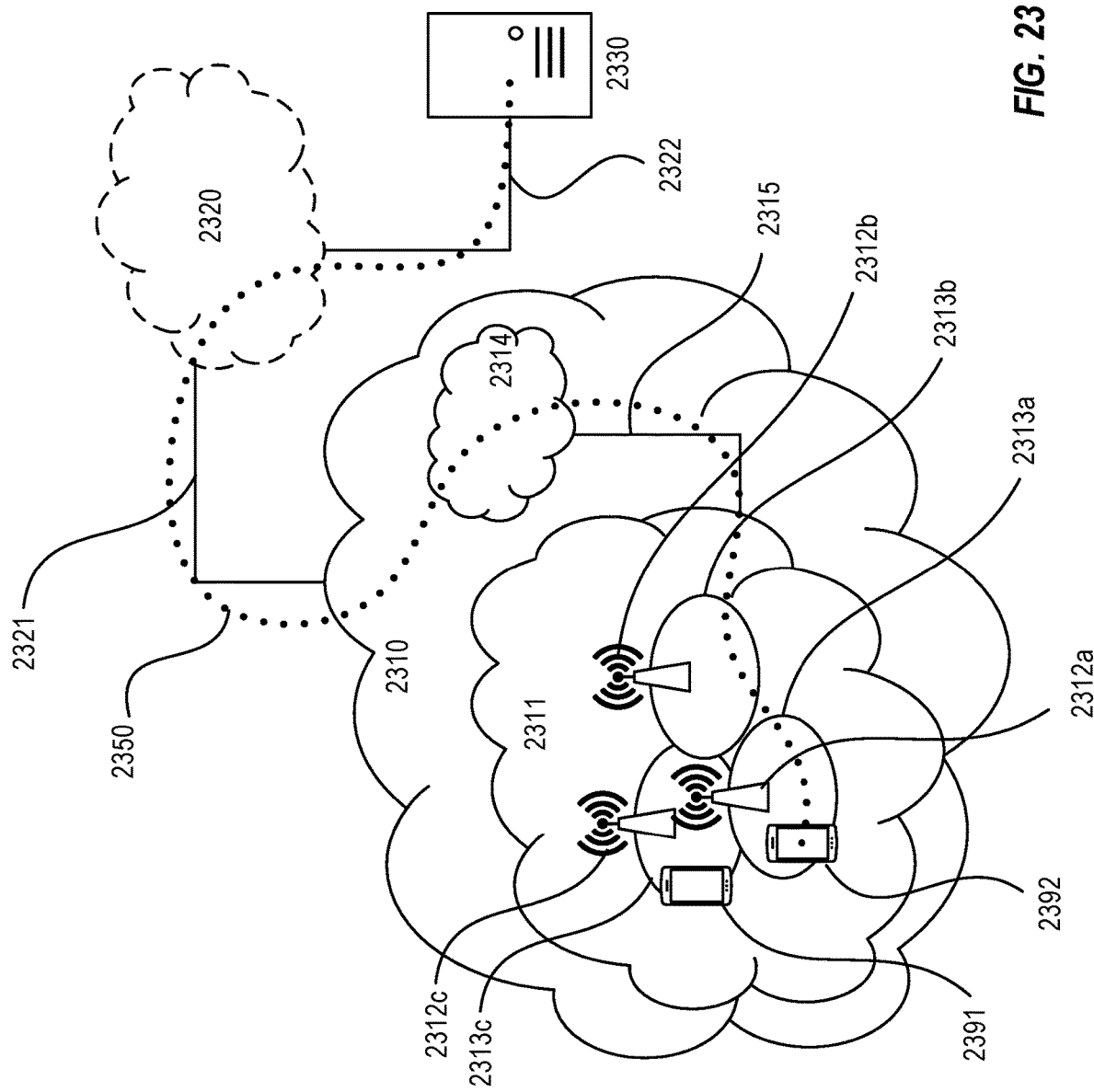
FIGS. 23-24 are block diagrams of various exemplary communication systems and/or networks, according to various exemplary embodiments of the present disclosure.

With reference to FIG. 23, in accordance with an embodiment, a communication system includes telecommunication network 2310, such as a 3GPP-type cellular network, which comprises access network 2311, such as a radio access network, and core network 2314. Access network 2311 comprises a plurality of base stations 2312a, 2312b, 2312c, such as NBs, eNBs, gNBs or other types of wireless access points, each defining a corresponding coverage area 2313a, 2313b, 2313c. Each base station 2312a, 2312b, 2312c is connectable to core network 2314 over a wired or wireless connection 2315. A first UE 2391 located in coverage area 2313c can be configured to wirelessly connect to, or be paged by, the corresponding base station 2312c. A second UE 2392 in coverage area 2313a is wirelessly connectable to the corresponding base station 2312a. While a plurality of UEs 2391, 2392 are illustrated in this example, the disclosed embodiments are equally applicable to a situation where a sole UE is in the coverage area or where a sole UE is connecting to the base station 2312a.

Telecommunication network 2310 is itself connected to host computer 2330, which can be embodied in the hardware and/or software of a standalone server, a cloud-implemented server, a distributed server or as processing resources in a server farm. Host computer 2330 can be under the ownership or control of a service provider, or can be operated by the service provider or on behalf of the service provider. Connections 2321 and 2322 between telecommunication network 2310 and host computer 2330 can extend directly from core network 2314 to host computer 2330 or can go via an optional intermediate network 2320. Intermediate network 2320 can be one of, or a combination of more than one of, a public, private or hosted network; intermediate network 2320, if any, can be a backbone network or the Internet; in particular, intermediate network 2320 can comprise two or more sub-networks (not shown).

The communication system of FIG. 23 as a whole enables connectivity between the connected UEs 2391, 2392 and host computer 2330. The connectivity can be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 can be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

Example implementations, in accordance with an embodiment, of the UE, base station and host computer discussed in the preceding paragraphs will now be described with reference to FIG. 24. In communication system 2400, host computer 2410 comprises hardware 2415 including communication interface 2416 configured to set up and maintain a wired or wireless connection with an interface of a different communication device of communication system 2400. Host computer 2410 further comprises processing circuitry 2418, which can have storage and/or processing capabilities. In particular, processing circuitry 2418 can comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 can be operable to provide a service to a remote user, such as UE 2430 connecting via OTT connection 2450 terminating at UE 2430 and host computer 2410. In providing the service to the remote user, host application 2412 can provide user data which is transmitted using OTT connection 2450.

Communication system 2400 can also include base station 2420 provided in a telecommunication system and comprising hardware 2425 enabling it to communicate with host computer 2410 and with UE 2430. Hardware 2425 can include communication interface 2426 for setting up and maintaining a wired or wireless connection with an interface of a different communication device of communication system 2400, as well as radio interface 2427 for setting up and maintaining at least wireless connection 2470 with UE 2430 located in a coverage area (not shown in FIG. 24) served by base station 2420. Communication interface 2426 can be configured to facilitate connection 2460 to host computer 2410. Connection 2460 can be direct or it can pass through a core network (not shown in FIG. 24) of the telecommunication system and/or through one or more intermediate networks outside the telecommunication system. In the embodiment shown, hardware 2425 of base station 2420 can also include processing circuitry 2428, which can comprise one or more programmable processors, application-specific integrated circuits, field programmable gate arrays or combinations of these (not shown) adapted to execute instructions.

Base station 2420 also includes software 2421 stored internally or accessible via an external connection. For example, software 2421 can include program instructions (also referred to as a computer program product) that, when executed by processing circuitry 2428, can configure base station 2420 to perform operations corresponding to various exemplary methods (e.g., procedures) described herein.

Communication system 2400 can also include UE 2430 already referred to. Its hardware 2435 can include radio interface 2437 configured to set up and maintain wireless connection 2470 with a base station serving a coverage area in which UE 2430 is currently located. Hardware 2435 of UE 2430 can also include processing circuitry 2438, which can comprise one or more programmable processors, application-specific integrated circuits, field programmable gate arrays or combinations of these (not shown) adapted to execute instructions.

UE 2430 also includes software 2431, which is stored in or accessible by UE 2430 and executable by processing circuitry 2438. Software 2431 includes client application 2432. Client application 2432 can be operable to provide a service to a human or non-human user via UE 2430, with the support of host computer 2410. In host computer 2410, an executing host application 2412 can communicate with the executing client application 2432 via OTT connection 2450 terminating at UE 2430 and host computer 2410. In providing the service to the user, client application 2432 can receive request data from host application 2412 and provide user data in response to the request data. OTT connection 2450 can transfer both the request data and the user data. Client application 2432 can interact with the user to generate the user data that it provides. Software 2431 can also include program instructions (also referred to as a computer program product) that, when executed by processing circuitry 2438, can configure UE 2430 to perform operations corresponding to various exemplary methods (e.g., procedures) described herein.

Figure 24:
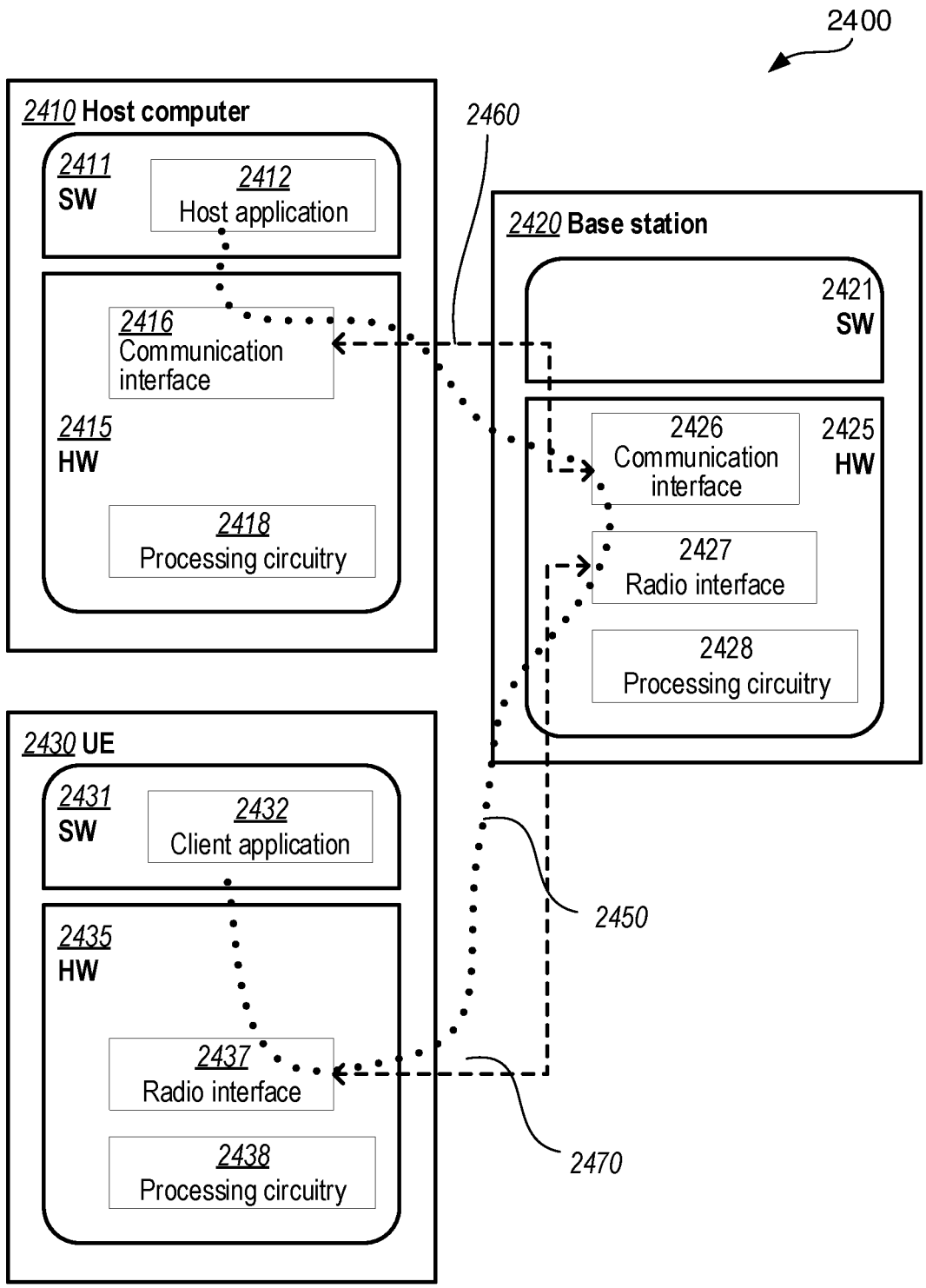

It is noted that host computer 2410, base station 2420 and UE 2430 illustrated in FIG. 24 can be similar or identical to host computer 2240, one of base stations 2212a, 2212b, 2212c and one of UEs 2291, 2292 of FIG. 22, respectively. This is to say, the inner workings of these entities can be as shown in FIG. 24 and independently, the surrounding network topology can be that of FIG. 22.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure can determine the routing, which it can be configured to hide from UE 2430 or from the service provider operating host computer 2410, or both. While OTT connection 2450 is active, the network infrastructure can further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2450 between host computer 2410 and UE 2430, in response to variations in the measurement results. The measurement procedure and/or the network functionality for to reconfiguring OTT connection 2450 can be implemented in software 2411 and hardware 2415 of host computer 2410 or in software 2431 and hardware 2435 of UE 2430, or both. In embodiments, sensors (not shown) can be deployed in or in association with communication devices through which OTT connection 2450 passes; the sensors can participate in the measurement procedure by supplying values of the monitored quantities exemplified above, or supplying values of other physical quantities from which software 2411, 2431 can compute or estimate the monitored quantities. The reconfiguring of OTT connection 2450 can include message format, retransmission settings, preferred routing etc.; the reconfiguring need not affect base station 2420, and it can be unknown or imperceptible to base station 2420. Such procedures and functionalities can be known and practiced in the art. In certain embodiments, measurements can involve proprietary UE signaling facilitating host computer 2410's measurements of throughput, propagation times, latency and the like. The measurements can be implemented in that software 2411 and 2431 causes messages to be transmitted, in particular empty or 'dummy' messages, using OTT connection 2450 while it monitors propagation times, errors etc.

FIG. 25 is a flowchart illustrating an exemplary method and/or procedure implemented in a communication system, in accordance with one embodiment. The communication system includes a host computer, a base station and a UE which, in some exemplary embodiments, can be those described with reference to FIGS. 23 and 24. For simplicity of the present disclosure, only drawing references to FIG. 25 will be included in this section. In step 2510, the host computer provides user data. In substep 2511 (which can be optional) of step 2510, the host computer provides the user data by executing a host application. In step 2520, the host computer initiates a transmission carrying the user data to the UE. In step 2530 (which can be optional), the base station transmits to the UE the user data which was carried in the transmission that the host computer initiated, in accordance with the teachings of the embodiments described throughout this disclosure. In step 2540 (which can also be optional), the UE executes a client application associated with the host application executed by the host computer.

FIG. 26 is a flowchart illustrating an exemplary method and/or procedure implemented in a communication system, in accordance with one embodiment. The communication system includes a host computer, a base station and a UE which can be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission can pass via the base station, in accordance with the teachings of the embodiments described throughout this disclosure. In step 2630 (which can be optional), the UE receives the user data carried in the transmission.

FIG. 27 is a flowchart illustrating an exemplary method and/or procedure implemented in a communication system, in accordance with one embodiment. The communication system includes a host computer, a base station and a UE which can be those described with reference to FIGS. 23 and 24. For simplicity of the present disclosure, only drawing references to FIG. 27 will be included in this section. In step 2710 (which can be optional), the UE receives input data provided by the host computer. Additionally or alternatively, in step 2720, the UE provides user data. In substep 2721 (which can be optional) of step 2720, the UE provides the user data by executing a client application. In substep 2711 (which can be optional) of step 2710, the UE executes a client application which provides the user data in reaction to the received input data provided by the host computer. In providing the user data, the executed client application can further consider user input received from the user. Regardless of the specific manner in which the user data was provided, the UE initiates, in substep 2730 (which can be optional), transmission of the user data to the host computer. In step 2740 of the method, the host computer receives the user data transmitted from the UE, in accordance with the teachings of the embodiments described throughout this disclosure.

FIG. 28 is a flowchart illustrating an exemplary method and/or procedure implemented in a communication system, in accordance with one embodiment. The communication system includes a host computer, a base station and a UE which can be those described with reference to FIGS. 23 and 24. For simplicity of the present disclosure, only drawing references to FIG. 28 will be included in this section. In step 2810 (which can be optional), in accordance with the teachings of the embodiments described throughout this disclosure, the base station receives user data from the UE. In step 2820 (which can be optional), the base station initiates transmission of the received user data to the host computer. In step 2830 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B.

Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated examples:

1. A method, performed by a source node, for beam-level mobility load balancing (MLB) in a radio access network (RAN), the method comprising:
    receiving one or more measurement reports from a plurality of UEs, each measurement report comprising radio measurements related to:
        a source beam transmitted by the source node; and
        a plurality of target beams transmitted by one or more target nodes in the RAN;
    exchanging beam-level load information with the target nodes;
    based on the measurement reports and the beam-level load information, selecting one or more particular target beams, associated with a particular target node, for handover of a subset of the UEs from the source beam; and
    transmitting, to the particular target node, a request comprising one or more handover offsets to be applied during MLB operations between one or more beams of the source node, including the source beam, and one or more beams of the particular target node, including the particular target beams.

2. The method of embodiment 1, further comprising receiving, from the particular target node, a response comprising one or more further handover offsets to be applied instead of the one or more handover offsets.

3. The method of embodiment 2, wherein the request is a Handover Request and the response is one of the following messages: a Handover Request Acknowlege, and a Handover Preparation Failure.

4. The method of embodiment 3, wherein the Handover Request further comprises information identifying one or more of the following:
    the subset of UEs;
    the particular target beams;
    expected load to be handed over;
    expected resources or capacity to be needed to serve UEs being handed over;
    type of traffic being handed over; and
    one or more network slices associated with the subset of UEs and/or the type of traffic being handed over.

5. The method of any of embodiments 3-4, wherein the Handover Request Acknowledge comprises measurement configuration information, for the subset of UEs, with respect to one or more beams of the particular target node.

6. The method of embodiment 2, wherein the request is a Handover Setting Change Request message and the response is a Handover Setting Change Response message.

7. The method of embodiment 6, further comprising performing a handover procedure with the particular target node with respect to the subset of UEs.

8. The method of embodiment 7, wherein the handover procedure comprises triggering handover of the subset of UEs to the particular target beam based on:
    the one or more handover offsets; or
    one or more further handover offsets received from the particular target node.

9. The method of any of embodiments 1-8, wherein the MLB operations include one or more of the following:
    a first handover of the subset of UEs from the source beam to the one or more particular target beams; and
    a second handover of the subset of UEs back to a coverage area of the source node.

10. The method of any of embodiments 1-9, wherein the one or more handover offsets comprise one or more of the following:
    a handover offset to be applied during a MLB operation between a single source beam and a single target beam;
    a handover offset to be applied during a MLB operation between a single source beam and any of a group of target beams;
    a handover offset to be applied during a MLB operation between any of a group of source beams and a single target beam; and
    a handover offset specific to the subset of UEs.

11. The method of any of embodiments 1-10, wherein exchanging beam-level load information with the target nodes comprises:
    determining source-beam load information for each of a plurality of source beams transmitted by the source node;
    sending the source-beam load information to each of the target nodes; and
    receiving, from each particular target node, target-beam load information for each of a plurality of target beams transmitted by the particular target node.

12. A method, performed by a target node, for beam-level mobility load balancing (MLB) in a radio access network (RAN), the method comprising:
    exchanging beam-level load information with a source node; and
    receiving, from the source node, a request comprising one or more handover offsets to be applied during MLB operations between one or more beams of the source node and one or more beams of the target node.

13. The method of embodiment 12, further comprising transmitting, to the source node, a response comprising one or more further handover offsets to be applied instead of the one or more handover offsets.

14. The method of embodiment 13, further comprising:
    receiving one or more measurement reports from a plurality of UEs, each measurement report comprising radio measurements related to one or more target beams transmitted by the target node; and
    determining the one or more further handover offsets based on the measurement reports and the beam-level load information.

15. The method of any of embodiments 13-14, wherein:
   the request is a Handover Request for a subset of the UEs served by a particular source beam of the source node; and
   the response is one of the following messages: a Handover Request Acknowlege, and a Handover Preparation Failure.

16. The method of embodiment 15, wherein the Handover Request further comprises one or more of the following:
   information identifying the subset of UEs;
   information identifying one or more particular target beams;
   expected load to be handed over;
   expected resources or capacity to be needed to serve the UEs being handed over;
   type of traffic being handed over; and
   information identifying one or more network slices associated with the subset of UEs and/or the type of traffic being handed over 17. The method of any of embodiments 15-16, wherein the Handover Request Acknowledge comprises measurement configuration information, for the subset of UEs, with respect to one or more beams of the target node.

18. The method of any of embodiments 13-14, wherein the request is a Handover Setting Change Request message and the response is a Handover Setting Change Response message.

19. The method of embodiment 18, further comprising performing a handover procedure, with the source node, with respect to a subset of the UEs served by a particular source beam of the source node 20. The method of any of embodiments 12-19, wherein the MLB operations include one or more of the following:
   a first handover of one or more UEs from a particular source beam to a particular target beam; and
   a second handover of one or more UEs back to a coverage area of the source node.

21. The method of any of embodiments 12-20, wherein the one or more handover offsets comprise one or more of the following:
   a handover offset to be applied during a MLB operation between a single source beam and a single target beam;
   a handover offset to be applied during a MLB operation between a single source beam and any of a group of target beams;
   a handover offset to be applied during a MLB operation between any of a group of source beams and a single target beam; and
   a handover offset specific to the subset of UEs.

22. The method of any of embodiments 12-21, wherein exchanging beam-level load information with the source node comprises:
   determining target-beam load information for each of a plurality of target beams transmitted by the target node;
   sending the target-beam load information to the source node; and
   receiving, from the source node, source-beam load information for each of a plurality of source beams transmitted by the source node.

23. A network node in a radio access network (RAN), comprising:
   communication circuitry configured to communicate with one or more other network nodes and one or more user equipment (UE);
   processing circuitry operably coupled to the communication circuitry and configured to perform operations corresponding to any of the methods of embodiments 1-22.

24. A network node configured for beam-level mobility load balancing (MLB) in a radio access network (RAN), the network node being arranged to perform operations corresponding to any of the methods of embodiments 1-22.

25. A non-transitory, computer-readable medium storing computer-executable instructions that, when executed by processing circuitry comprising a network node in radio access network (RAN), configure the network node to perform operations corresponding to any of the methods of claims 1-22.

26. A communication system including a host computer, the host computer comprising:
   a. processing circuitry configured to provide user data; and
   b. a communication interface configured to forward the user data to a cellular network for transmission to a user equipment (UE) through a core network (CN) and a radio access network (RAN);
   wherein:
   c. the RAN comprises first and second nodes;
   d. the first node comprises a communication transceiver and processing circuitry configured to perform operations corresponding to any of the methods of embodiments 1-11; and
   e. the second node comprises a communication transceiver and processing circuitry configured to perform operations corresponding to any of the methods of embodiments 12-22.

27. The communication system of the previous embodiment, further comprising the UE.

28. The communication system of any of the previous two embodiments, wherein:
   f. the processing circuitry of the host computer is configured to execute a host application, thereby providing the user data; and
   g. the UE comprises processing circuitry configured to execute a client application associated with the host application.

29. A method implemented in a communication system including a host computer, a cellular network, and a user equipment (UE), the method comprising:
   h. at the host computer, providing user data;
   i. at the host computer, initiating a transmission carrying the user data to the UE via a cellular network comprising an radio access network (RAN); and
   j. operations, performed by first and second nodes of the RAN, corresponding to any of the methods of embodiments 1-22.

30. The method of the previous embodiment, wherein the data message comprises the user data, and further comprising transmitting the user data to the UE via the first node or the second node.

31. The method of any of the previous two embodiments, wherein the user data is provided at the host computer by executing a host application, the method further comprising, at the UE, executing a client application associated with the host application.

32. A communication system including a host computer comprising a communication interface configured to receive user data originating from a transmission from a user equipment (UE) via a first node or a second node in a radio access network (RAN), wherein:

a. the first node comprises a communication interface and processing circuitry configured to perform operations corresponding to any of the methods of embodiments 1-11; and b. the second node comprises a communication interface and processing circuitry configured to perform operations corresponding to any of the methods of embodiments 12-22.

33. The communication system of the previous embodiment, further including the UE.

34. The communication system of any of the previous two embodiments, wherein:

a. the processing circuitry of the host computer is configured to execute a host application; and b. the UE is configured to execute a client application associated with the host application, thereby providing the user data to be received by the host computer.

The invention claimed is:

1. A method, performed by a source node, for beam-level mobility load balancing (MLB) in a radio access network (RAN), the method comprising:

exchanging beam-level load information with one or more target nodes in the RAN;

based on the beam-level load information, selecting one or more particular target beams, associated with a particular target node, for MLB operations with a particular source beam associated with the source node; and transmitting, to the particular target node, a request including one or more first handover offsets to be applied during MLB operations between:

a group of one or more source beams associated with the source node, including the particular source beam; and a group of one or more target beams associated with the particular target node, including the selected one or more particular target beams; and receiving, from the particular target node, a response including one of the following:

an acknowledgement that the one or more first handover offsets will be applied; or one or more second handover offsets to be applied instead of the one or more first handover offsets, wherein:

the request is a Handover Request for a subset of a first plurality of user equipment (UEs) to the selected one or more particular target beams; and the response is one of the following messages: a Handover Request Acknowledge, or a Handover Preparation Failure.

2. The method of claim 1, wherein the request also includes information identifying one or more of the following:

the subset of the first plurality of UEs;
the group of one or more target beams;
expected load to be handed over;
expected resources or capacity needed to serve UEs being handed over;
type of traffic being handed over; and
one or more network slices associated with at least one of the following: the subset of the first plurality of UEs, and the type of traffic being handed over.

3. The method of claim 1, wherein the response is the Handover Request Acknowledge message and includes measurement configuration information, for the subset of the first plurality of UEs, with respect to one or more beams of the particular target node.

4. The method of claim 1, wherein:

the method further comprises receiving one or more measurement reports from the first plurality of user equipment (UEs);

each measurement report comprising radio measurements related to the particular source beam and to a plurality of target beams, including the selected one or more particular target beams; and the one or more particular target beams are selected from the plurality of target beams further based on the one or more measurement reports from the first plurality of user equipment.

5. The method of claim 1, wherein each beam, of the group of one or more source beams and the group of one or more target beams, is one of the following:

an SS/PBCH block (SSB) beam;
a channel state information reference signal (CSI-RS) beam; or
a link beam.

6. The method of claim 1, wherein the one or more first handover offsets include one or more of the following:

a handover offset specific to a first beam of the group of one or more target beams;

a handover offset specific to the group of one or more target beams;

a handover offset specific to the group of one or more target beams and to a second beam of the group of one or more source beams;

a handover offset specific to a first beam from the group of one or more target beams and to a second beam of the group of one or more source beams; and a handover offset specific to the subset of the first plurality of UEs.

7. The method of claim 1, wherein exchanging beam-level load information with the one or more target nodes comprises:

sending a load information request to each of the one or more target nodes; and receiving, from each particular target node, target-beam load information for one or more target beams associated with the particular target node.

8. The method of claim 7, wherein the load information request to each of the one or more target nodes identifies the one or more target beams for which load information is requested by the source node.

9. A method, performed by a target node, for beam-level mobility load balancing (MLB) in a radio access network (RAN), the method comprising:

exchanging beam-level load information with a source node in the RAN; and receiving, from the source node, a request including one or more first handover offsets to be applied during MLB operations between:

a group of one or more source beams associated with the source node, including a particular source beam serving a first plurality of user equipment (UEs); and a group of one or more target beams associated with the target node; and transmitting, to the source node, a response including one of the following:

an acknowledgement that the one or more first handover offsets will be applied; or one or more second handover offsets to be applied instead of the one or more first handover offsets, wherein:

the request is a Handover Request for a subset of the first plurality of UEs to a particular one of the group of one or more target beams; and the response is one of the following messages: a Handover Request Acknowledge, and a Handover Preparation Failure.

10. The method of claim 9, wherein the request also includes information identifying one or more of the following:
- the subset of the first plurality of UEs;
- the group of one or more target beams;
- expected load to be handed over;
- expected resources or capacity to be needed to serve UEs being handed over;
- type of traffic being handed over; and
- one or more network slices associated with at least one of the following: the subset of the first plurality of UEs, and the type of traffic being handed over.

11. The method of claim 9, wherein the response is the Handover Request Acknowledge message and includes measurement configuration information, for the subset of the first plurality of UEs, with respect to one or more beams of the target node.

12. The method of claim 9, further comprising:
receiving one or more measurement reports from a second plurality of UEs, each measurement report including radio measurements related to one or more target beams associated with the target node; and
determining the one or more second handover offsets based on the one or more measurement reports from the second plurality of UEs and the beam-level load information.

13. The method of claim 9, wherein each beam, of the group of one or more source beams and the group of one or more target beams, is one of the following:
an SS/PBCH block (SSB) beam;
a channel state information reference signal (CSI-RS) beam; or
a link beam.

14. The method of claim 9, wherein the one or more first handover offsets include one or more of the following:
a handover offset specific to a first beam of the group of one or more target beams;
a handover offset specific to the group of one or more target beams;
a handover offset specific to the group of one or more target beams and to a second beam of the group of one or more source beams;
a handover offset specific to a first beam from the group of one or more target beams and to a second beam of the group of one or more source beams; and
a handover offset specific to the subset of the first plurality of UEs.

15. The method of claim 9, wherein exchanging beam-level load information with the source node comprises:
receiving a load information request from the source node; and
sending, to the source node, target-beam load information for one or more target beams associated with the target node.

16. The method of claim 15, wherein the load information request from the source node identifies the one or more target beams for which load information is requested by the source node.

17. A network node configured for beam-level mobility load balancing in a radio access network (RAN), the network node comprising:
communication interface circuitry configured to communicate with one or more user equipment (UEs) and with one or more target nodes in the RAN; and
processing circuitry operably coupled with the communication interface circuitry, whereby the processing circuitry and the communication interface circuitry are configured to:
exchange beam-level load information with the one or more target nodes;
based on the beam-level load information, select one or more particular target beams, associated with a particular target node, for MLB operations with a particular source beam associated with the network node; and
transmit, to the particular target node, a request including one or more first handover offsets to be applied during MLB operations between:
a group of one or more source beams associated with the source node, including the particular source beam; and
a group of one or more target beams associated with the particular target node, including the selected one or more particular target beams; and
receive, from the particular target node, a response including one of the following:
an acknowledgement that the one or more first handover offsets will be applied; or
one or more second handover offsets to be applied instead of the one or more first handover offsets,
wherein:
the request is a Handover Request for a subset of a first plurality of user equipment (UEs) to the selected one or more particular target beams; and
the response is one of the following messages: a Handover Request Acknowledge, or a Handover Preparation Failure.

18. A non-transitory, computer-readable medium storing program instructions that, when executed by processing circuitry of a network node of a radio access network (RAN), configure the network node to perform operations corresponding to the method of claim 1.

19. A network node configured for beam-level mobility load balancing in a radio access network (RAN), the network node comprising:
communication interface circuitry configured to communicate with one or more user equipment (UEs) and with a source node in the RAN; and
processing circuitry operably coupled with the communication interface circuitry, whereby the processing circuitry and the communication interface circuitry are configured to perform operations corresponding to the method of claim 9.

20. A non-transitory, computer-readable medium storing program instructions that, when executed by processing circuitry of a network node of a radio access network (RAN), configure the network node to perform operations corresponding to the method of claim 9.

* * * * *